(12) United States Patent
Li

(10) Patent No.: US 10,153,813 B2
(45) Date of Patent: Dec. 11, 2018

(54) INFORMATION PROCESSING METHOD, BASE STATION, AND USER EQUIPMENT

(71) Applicant: Huawei Technologies Co., Ltd., Shenzhen (CN)

(72) Inventor: Chao Li, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 70 days.

(21) Appl. No.: 15/352,024

(22) Filed: Nov. 15, 2016

(65) Prior Publication Data

US 2017/0063436 A1  Mar. 2, 2017

Related U.S. Application Data

(63) Continuation of application No. PCT/CN2014/077698, filed on May 16, 2014.

(51) Int. Cl.
| | |
|---|---|
| H04B 7/04 | (2017.01) |
| H04B 7/0413 | (2017.01) |
| H04W 24/10 | (2009.01) |
| H04B 7/0456 | (2017.01) |
| H04B 7/06 | (2006.01) |
| H04L 5/00 | (2006.01) |
| H04W 72/04 | (2009.01) |

(52) U.S. Cl.
CPC ......... *H04B 7/0413* (2013.01); *H04B 7/0456* (2013.01); *H04B 7/0626* (2013.01); *H04L 5/0048* (2013.01); *H04W 24/10* (2013.01); *H04W 72/042* (2013.01); *H04W 72/0453* (2013.01)

(58) Field of Classification Search
CPC .... H04L 1/0026; H04L 5/0023; H04B 7/0639
See application file for complete search history.

(56) References Cited

U.S. PATENT DOCUMENTS 8,599,715 B2 * 12/2013 Kim ............... H04L 1/0025
370/252
2012/0176939 A1  7/2012 Qu et al.
2013/0163461 A1  6/2013 Kim et al.

FOREIGN PATENT DOCUMENTS

CN  101877884 A  11/2010
CN  102263583 A  11/2011
(Continued)

*Primary Examiner* — Chandrahas B Patel
(74) *Attorney, Agent, or Firm* — Slater Matsil, LLP

(57) ABSTRACT

Embodiments provide an information processing method, a base station, and user equipment. The method includes determining multiple subband groups, where the multiple subband groups are obtained by dividing multiple physical resource blocks corresponding to resource elements (REs) originally occupied by a CSI-RS, and each subband group in the multiple subband groups includes at least one subband. The method also includes determining a reference signal corresponding to each subband group in the multiple subband groups, where the reference signal corresponding to each subband group is generated by performing a precoding operation on the CSI-RS originally carried in first bearer REs in each subband in each subband group. Additionally, the method includes transmitting, by using the first bearer REs in each subband group in the multiple subband groups, the reference signal corresponding to each subband group.

20 Claims, 17 Drawing Sheets

(56) References Cited

FOREIGN PATENT DOCUMENTS

| | | | |
|---|---|---|---|
| CN | 103297153 | A | 9/2013 |
| WO | 2011013986 | A2 | 2/2011 |
| WO | 2014042422 | A2 | 3/2014 |

\* cited by examiner

100

```
┌─────────────────────────────────────────────────────────┐
│ Determine multiple subband groups, where the multiple   │
│ subband groups are obtained by dividing multiple        │  S110
│ physical resource blocks corresponding to REs           │
│ originally occupied by a CSI-RS, each subband group     │
│ in the multiple subband groups includes at least one    │
│ subband, and each subband includes at least one PRB     │
└─────────────────────────────────────────────────────────┘
                              │
┌─────────────────────────────────────────────────────────┐
│ Determine a reference signal corresponding to each      │
│ subband group in the multiple subband groups, where     │
│ the reference signal corresponding to each subband      │  S120
│ group is generated by performing a precoding operation  │
│ on a CSI-RS originally carried in first bearer REs in   │
│ each subband in each subband group, and different       │
│ precoding is used when precoding operations are         │
│ performed on the CSI-RS originally carried in the first │
│ bearer REs in different subband groups                  │
└─────────────────────────────────────────────────────────┘
                              │
┌─────────────────────────────────────────────────────────┐
│ Transmit, by using the first bearer REs in each subband │  S130
│ group in the multiple subband groups, the reference     │
│ signal corresponding to each subband group              │
└─────────────────────────────────────────────────────────┘
```

FIG. 1

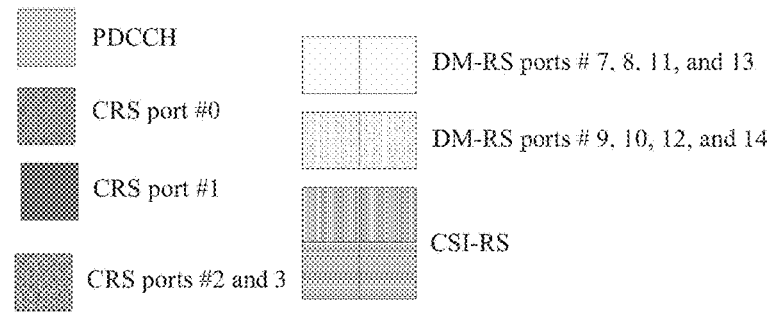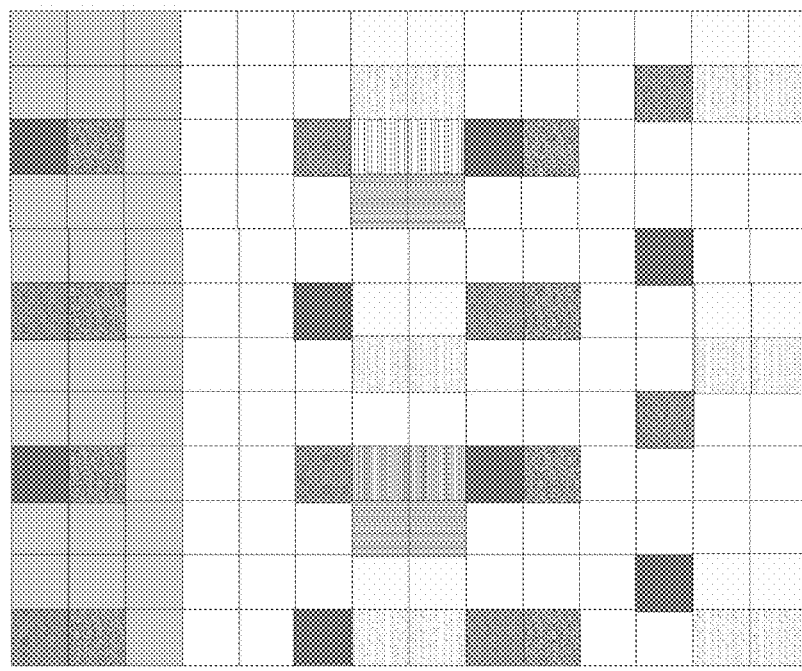
FIG. 2a

100

```
┌─────────────────────────────────────────────────────────────┐
│ Determine multiple subband groups, where the multiple subband│
│ groups are obtained by dividing multiple physical resource   │ S110
│ blocks corresponding to REs originally occupied by a CSI-RS, │
│ each subband group in the multiple subband groups includes   │
│ at least one subband, and each subband includes at least one PRB│
└─────────────────────────────────────────────────────────────┘
                              │
                              ▼
┌─────────────────────────────────────────────────────────────┐
│ Determine a reference signal corresponding to each subband   │
│ group in the multiple subband groups, where the reference    │
│ signal corresponding to each subband group is generated by   │ S120
│ performing a precoding operation on a CSI-RS originally      │
│ carried in first bearer REs in each subband in each subband  │
│ group, and different precoding is used when precoding        │
│ operations are performed on the CSI-RSs originally carried   │
│ in the first bearer REs in different subband groups          │
└─────────────────────────────────────────────────────────────┘
                              │
                              ▼
┌─────────────────────────────────────────────────────────────┐
│ Transmit, by using the first bearer RE in each subband group │
│ in the multiple subband groups, the reference signal         │ S130
│ corresponding to each subband group in the multiple subband  │
│ groups                                                       │
└─────────────────────────────────────────────────────────────┘
                              │
                              ▼
┌─────────────────────────────────────────────────────────────┐
│ Receive feedback information transmitted by user equipment,  │
│ where the feedback information is channel state information  │ S140
│ obtained by the user equipment through estimation according  │
│ to the first CSI-RS                                          │
└─────────────────────────────────────────────────────────────┘
                              │
                              ▼
┌─────────────────────────────────────────────────────────────┐
│ Acquire a channel state of the user equipment according to   │ S150
│ the feedback information                                     │
└─────────────────────────────────────────────────────────────┘
```

Receive, in first bearer resource elements REs in each subband group in multiple subband groups, a reference signal transmitted by a base station and corresponding to each subband group, where the multiple subband groups are obtained by dividing multiple physical resource blocks corresponding to REs originally occupied by a CSI-RS, the reference signal corresponding to each subband group in the multiple subband groups is generated by performing a precoding operation on the CSI-RS originally carried in the first bearer REs in each subband in each subband group, and different precoding is used when precoding operations are performed on the CSI-RS originally carried in the first bearer REs in different subband groups ⟋ S210

Obtain channel state information through estimation according to the reference signal corresponding to each subband group in the multiple subband groups ⟋ S220

Transmit feedback information to the base station, where the feedback information includes the channel state information ⟋ S230

FIG. 9

INFORMATION PROCESSING METHOD, BASE STATION, AND USER EQUIPMENT

CROSS-REFERENCE TO RELATED APPLICATIONS

This application is a continuation of International Application No. PCT/CN2014/077698, filed on May 16, 2014, the disclosure of which is hereby incorporated by reference in its entirety.

TECHNICAL FIELD

Embodiments relate to the communications field, and in particular, to an information processing method, a base station, and user equipment.

BACKGROUND

In current wireless communications systems such as Long Term Evolution (LTE) and Long Term Evolution-Advanced (LTE-A) communications systems, base stations (for example, eNBs) generally use a Multiple-Input Multiple-Output (MIMO) technology based on multiple antennas. The MIMO technology may be used to concurrently transmit data of multiple layers in a same time-frequency resource in space or transmit a data stream at multiple layers in space, so that a compromise is achieved between multiplexing and diversity. Regardless of whether multiplexing or diversity is used, the multi-antenna MIMO technology provides additional resources and degrees of freedom in a space domain. Both theoretical research and engineering practice fully prove that the spectral efficiency of a wireless communications system can be greatly improved by using these resources and degrees of freedom.

When concurrent data of multiple streams is concurrently transmitted in space, a receiver needs to demodulate the concurrent data of multiple layers. Currently, in all mainstream wireless communications systems, coherent demodulation based on a reference signal is used, and a receiver needs to estimate downlink channel state information by using a specific reference signal, and feed back corresponding information to a base station. Therefore, a channel state information reference signal (CSI-RS) for estimating downlink channel state information is critical in a multi-antenna MIMO wireless communications system. In particular, when there are more antennas, higher requirements are imposed on reference signal design. In an LTE Release 8 (Rel-8) system, a configuration with a maximum of four antenna ports is supported, and a demodulation reference signal in use is a cell-specific reference signal (CRS) based on an antenna port. In LTE Release 10 (Rel-10), a maximum of eight antenna ports is introduced, and in addition, to support CSI measurement on the eight antenna ports, a CSI-RS reference signal is introduced. CSI-RS signals actually used may be configured according to requirements, but a maximum quantity of antenna ports cannot exceed eight that is currently defined in a protocol. In actual use, generally, a quantity of required CSI-RS antenna ports depends on a quantity of physical antennas.

However, in a currently researched two-dimensional antenna array, a quantity of antennas far exceeds 8 that is currently defined in a system. For example, a maximum quantity of antennas on a base station side may reach 12, 32, or 64. Theoretical research proves that if the quantity of antennas on the base station side is greater, a greater performance gain can be achieved in the system. To implement use of more antennas on the base station side, the system needs to extend a method for transmitting and using a CSI-RS reference signal. Currently, due to a maximum of eight CSI-RS antenna ports, more transmit antennas cannot be supported.

SUMMARY

Embodiments provide a base station, user equipment, and an information processing method, which can support more transmit antennas without increasing resource consumption.

According to a first aspect, a base station is provided and includes a first determining unit, configured to determine multiple subband groups, where the multiple subband groups are obtained by dividing multiple physical resource blocks corresponding to resource elements (REs) originally occupied by a channel state information reference signal (CSI-RS), and each subband group in the multiple subband groups includes at least one subband. The base station also includes a second determining unit, configured to determine a reference signal corresponding to each subband group in the multiple subband groups, where the reference signal corresponding to each subband group is generated by performing a precoding operation on the CSI-RS originally carried in first bearer REs in each subband in each subband group, and different precoding is used when precoding operations are performed on the CSI-RS originally carried in the first bearer REs in different subband groups. Additionally, the base station includes a transmitting unit, configured to transmit, by using the first bearer REs in each subband group in the multiple subband groups, the reference signal corresponding to each subband group.

With reference to the first aspect, in a first possible implementation manner of the first aspect, the CSI-RS is a CSI-RS defined in Release Rel-10 of a Long Term Evolution (LTE) protocol.

With reference to the first aspect or the foregoing first possible implementation manner of the first aspect, in a second possible implementation manner of the first aspect, each subband group in the multiple subband groups includes multiple subbands, and each subband includes one physical resource block or multiple continuous physical resource blocks in a frequency domain, where the multiple subbands included in each subband group are continuous in the frequency domain.

With reference to the first aspect or the foregoing first possible implementation manner of the first aspect, in a third possible implementation manner of the first aspect, each subband group in the multiple subband groups includes multiple subbands, and each subband includes one physical resource block or multiple continuous physical resource blocks in a frequency domain, where the multiple subbands included in each subband group are discrete in the frequency domain.

With reference to any one of the first aspect or the foregoing possible implementation manners of the first aspect, in a fourth possible implementation manner of the first aspect, the base station further includes: a first receiving unit, configured to receive feedback information transmitted by the user equipment, where the feedback information is channel state information obtained by the user equipment according to the reference signal corresponding to each subband group in the multiple subband groups, where the channel state information includes channel state information corresponding to at least one subband group and/or channel state information corresponding to each subband in the at least one subband group; and a first acquiring unit, configured to acquire a channel state of the user equipment according to the feedback information.

With reference to any one of the first aspect or the foregoing possible implementation manners of the first aspect, in a fifth possible implementation manner of the first aspect, the transmitting unit is further configured to: transmit the CSI-RS to the user equipment by using second bearer REs in each subband in each subband group, where the second bearer REs are REs originally occupied by the CSI-RS and are different from the first bearer REs; where the reference signal corresponding to each subband group in the multiple subband groups and the CSI-RS transmitted by using the second bearer REs are transmitted in a same antenna direction.

With reference to any one of the first aspect or the foregoing possible implementation manners of the first aspect, in a sixth possible implementation manner of the first aspect, the base station further includes: a second receiving unit, configured to receive feedback information transmitted by the user equipment, where the feedback information includes channel state information obtained by the user equipment through estimation according to the reference signal corresponding to each subband group in the multiple subband groups and the CSI-RS transmitted in the second bearer REs, where the channel state information includes a channel quality indicator (CQI) difference corresponding to each subband group and/or a CQI difference corresponding to each subband in each subband group; and a second acquiring unit, configured to acquire a channel state of the user equipment according to the feedback information.

With reference to any one of the first aspect or the foregoing possible implementation manners of the first aspect, in a seventh possible implementation manner of the first aspect, in a same subframe, the transmitting unit transmits, by using the first bearer REs, the reference signal corresponding to each subband group in the multiple subband groups, and transmits the CSI-RS by using the second bearer REs.

With reference to any one of the first aspect or the foregoing possible implementation manners of the first aspect, in an eighth possible implementation manner of the first aspect, in different subframes, the transmitting unit transmits, by using the first bearer REs, the reference signal corresponding to each subband group in the multiple subband groups, and transmits the CSI-RS by using the second bearer REs.

With reference to any one of the first aspect or the foregoing possible implementation manners of the first aspect, in a ninth possible implementation manner of the first aspect, the transmitting unit is further configured to: transmit the CSI-RS by using third bearer REs; where the reference signal corresponding to each subband group in the multiple subband groups is transmitted in a first antenna direction, the CSI-RS is transmitted in a second antenna direction, the third bearer REs are REs originally occupied by the CSI-RS, and the third bearer REs are different from the first bearer REs.

With reference to any one of the first aspect or the foregoing possible implementation manners of the first aspect, in a tenth possible implementation manner of the first aspect, the base station further includes: a third receiving unit, configured to receive feedback information transmitted by the user equipment, where the feedback information is channel state information obtained by the user equipment through estimation according to the reference signal corresponding to each subband group in the multiple subband groups and the CSI-RS transmitted in the third bearer REs; and a third acquiring unit, configured to acquire a channel state of the user equipment according to the feedback information.

With reference to any one of the first aspect or the foregoing possible implementation manners of the first aspect, in an eleventh possible implementation manner of the first aspect, the channel state information includes a CQI in the first direction and corresponding to each subband group in at least one subband group, and/or includes at least one of a precoding matrix indicator (PMI), a rank indicator (RI), and a CQI in the second direction.

With reference to any one of the first aspect or the foregoing possible implementation manners of the first aspect, in a twelfth possible implementation manner of the first aspect, the base station further includes: a receiving unit, configured to receive feedback information transmitted by the user equipment, where the feedback information includes channel state information obtained by the user equipment through estimation according to the reference signal corresponding to each subband group in the multiple subband groups; and an acquiring unit, configured to acquire a channel state of the user equipment according to the feedback information.

According to a second aspect, user equipment is provided and includes a receiving unit, configured to receive, in first bearer REs in each subband group in multiple subband groups, a reference signal transmitted by a base station and corresponding to each subband group, where the multiple subband groups are obtained by dividing multiple physical resource blocks corresponding to REs originally occupied by the CSI-RS, the reference signal corresponding to each subband group in the multiple subband groups is generated by performing a precoding operation on the CSI-RS originally carried in the first bearer REs in each subband in each subband group, and different precoding is used when precoding operations are performed on the CSI-RS originally carried in the first bearer REs in different subband groups. The user equipment also includes an acquiring unit, configured to obtain channel state information through estimation according to the reference signal corresponding to each subband group in the multiple subband groups. Additionally, the user equipment includes a transmitting unit, configured to transmit feedback information to the base station, where the feedback information includes the channel state information.

With reference to the second aspect, in a first possible implementation manner of the second aspect, the CSI-RS is a CSI-RS defined in Release Rel-10 of an LTE protocol.

With reference to the second aspect or the foregoing first possible implementation manner of the second aspect, in a second possible implementation manner of the second aspect, each subband group in the multiple subband groups includes multiple subbands, and each subband includes one physical resource block or multiple continuous physical resource blocks in a frequency domain, where the multiple subbands included in each subband group are continuous in the frequency domain.

With reference to the second aspect or the foregoing first possible implementation manner of the second aspect, in a third possible implementation manner of the second aspect, each subband group in the multiple subband groups includes multiple subbands, and each subband includes one physical resource block or multiple continuous physical resource blocks in a frequency domain, where the multiple subbands included in each subband group are discrete in the frequency domain.

With reference to any one of the second aspect or the foregoing possible implementation manners of the second aspect, in a fourth possible implementation manner of the second aspect, the acquiring unit is specifically configured to: obtain the channel state information through estimation according to the reference signal corresponding to each subband group in the multiple subband groups, where the channel state information includes channel state information corresponding to at least one subband group in the multiple subband groups and/or channel state information corresponding to each subband in the at least one subband group.

With reference to any one of the second aspect or the foregoing possible implementation manners of the second aspect, in a fifth possible implementation manner of the second aspect, the acquiring unit is specifically configured to: perform channel estimation on each physical resource block in each subband group to obtain a signal to interference plus noise ratio (SINR) corresponding to each physical resource block in each subband group; perform averaging processing on SINRs corresponding to all physical resource blocks in each subband group to obtain an SINR corresponding to each subband group; determine, according to the SINR corresponding to each subband group, the at least one subband group from the multiple subband groups, where an SINR corresponding to each subband group in the at least one subband group is greater than an SINR corresponding to other subband groups than the at least one subband group; and obtain, according to the SINR corresponding to the at least one subband group, a CQI corresponding to the at least one subband group; where the channel state information includes the CQI corresponding to the at least one subband group.

With reference to any one of the second aspect or the foregoing possible implementation manners of the second aspect, in a sixth possible implementation manner of the second aspect, the acquiring unit is specifically configured to: obtain, according to an SINR value corresponding to a physical resource block of each subband in each subband group in the at least one subband group, an SINR value corresponding to each subband in each subband group in the at least one subband group; and obtain, according to the SINR value corresponding to each subband in each subband group in the at least one subband group, a CQI corresponding to each subband in each subband group in the at least one subband group; where the channel state information further includes the CQI corresponding to each subband in the at least one subband group.

With reference to any one of the second aspect or the foregoing possible implementation manners of the second aspect, in a seventh possible implementation manner of the second aspect, the receiving unit is further configured to receive the CSI-RS transmitted by the base station by using second bearer REs in each subband in each subband group, where the second bearer REs are REs originally occupied by the CSI-RS and are different from the first bearer REs, where the reference signal corresponding to each subband group in the multiple subband groups and the CSI-RS transmitted by using the second bearer REs are transmitted in a same antenna direction; and the acquiring unit is specifically configured to obtain the channel state information through estimation according to the reference signal corresponding to each subband group in the multiple subband groups and the CSI-RS received in the second bearer REs.

With reference to any one of the second aspect or the foregoing possible implementation manners of the second aspect, in an eighth possible implementation manner of the second aspect, the acquiring unit is specifically configured to: obtain, according to a channel estimation value obtained by performing channel estimation on the reference signal carried in the first bearer REs in each subband in each subband group in the multiple subband groups and a channel estimation value obtained by performing channel estimation on the reference signal carried in the second bearer REs in each subband, a channel estimation value difference corresponding to each subband in each subband group, where the channel estimation values are SINRs and the channel estimation value difference is an SINR difference, or the channel estimation values are CQIs and the channel estimation value difference is a CQI difference; perform averaging processing on channel estimation value differences corresponding to all subbands in each subband group to obtain a channel estimation value difference corresponding to each subband group; and determine at least one subband group according to the channel estimation value difference corresponding to each subband group, and determine the channel state information, where a channel estimation value difference of the at least one subband group is greater than channel estimation value differences of other subband groups, and the channel state information includes a CQI difference corresponding to each subband group in the at least one subband group.

With reference to any one of the second aspect or the foregoing possible implementation manners of the second aspect, in a ninth possible implementation manner of the second aspect, the channel state information acquired by the acquiring unit further includes a CQI difference corresponding to each subband in each subband group in the at least one subband group.

With reference to any one of the second aspect or the foregoing possible implementation manners of the second aspect, in a tenth possible implementation manner of the second aspect, the reference signals corresponding to the multiple subband groups and the CSI-RS transmitted in the second bearer REs by the base station are received in different subframes.

With reference to any one of the second aspect or the foregoing possible implementation manners of the second aspect, in an eleventh possible implementation manner of the second aspect, the reference signal corresponding to each subband group in the multiple subband groups and the CSI-RS transmitted in the second bearer REs by the base station are received in a same subframe.

With reference to any one of the second aspect or the foregoing possible implementation manners of the second aspect, in a twelfth possible implementation manner of the second aspect, the receiving unit is further configured to receive, in third bearer REs, the CSI-RS transmitted by the base station, where the reference signal corresponding to each subband group in the multiple subband groups is transmitted in a first antenna direction by the base station, the CSI-RS is transmitted in a second antenna direction by the base station by using the third bearer REs, and the third bearer REs are REs originally occupied by the CSI-RS and are different from the first bearer REs; and the acquiring unit is specifically configured to obtain the channel state information through estimation according to the reference signal corresponding to each subband group in the multiple subband groups and the CSI-RS received in the third bearer REs.

With reference to any one of the second aspect or the foregoing possible implementation manners of the second aspect, in a thirteenth possible implementation manner of the second aspect, the acquiring unit is specifically configured to: obtain, according to the reference signal corresponding to each subband group in the multiple subband groups, a CQI in the first direction and corresponding to each subband group in at least one subband group; and obtain, according to the CSI-RS, at least one of a PMI, an RI, and a CQI in the second direction.

According to a third aspect, a base station is provided and includes a network interface, a bus, a processor, and a memory, where the network interface is configured to implement communication connection to at least one other network element; the bus is configured to implement connection and communication between internal components of the base station; the memory is configured to store program code; and the processor is configured to invoke the program code stored in the memory to perform the following operations: determining multiple subband groups, where the multiple subband groups are obtained by dividing multiple physical resource blocks corresponding to REs originally occupied by a CSI-RS, and each subband group in the multiple subband groups includes at least one subband; determining a reference signal corresponding to each subband group in the multiple subband groups, where the reference signal corresponding to each subband group is generated by performing a precoding operation on the CSI-RS originally carried in first bearer REs in each subband in each subband group, and different precoding is used when precoding operations are performed on the CSI-RS originally carried in the first bearer REs in different subband groups; and transmitting, through the network interface by using the first bearer REs in each subband group in the multiple subband groups, the reference signal corresponding to each subband group.

With reference to the third aspect, in a first possible implementation manner of the third aspect, the CSI-RS is a CSI-RS defined in Release Rel-10 of an LTE protocol.

With reference to the third aspect or the foregoing first possible implementation manner of the third aspect, in a second possible implementation manner of the third aspect, each subband group in the multiple subband groups includes multiple subbands, and each subband includes one physical resource block or multiple continuous physical resource blocks in a frequency domain, where the multiple subbands included in each subband group are continuous in the frequency domain.

With reference to the third aspect or the foregoing first possible implementation manner of the third aspect, in a third possible implementation manner of the third aspect, each subband group in the multiple subband groups includes multiple subbands, and each subband includes one physical resource block or multiple continuous physical resource blocks in a frequency domain, where the multiple subbands included in each subband group are discrete in the frequency domain.

With reference to any one of the third aspect or the foregoing possible implementation manners of the third aspect, in a fourth possible implementation manner of the third aspect, the processor is configured to invoke the program code stored in the memory to further perform the following operations: receiving, through the network interface, feedback information transmitted by the user equipment, where the feedback information is channel state information obtained by the user equipment according to the reference signal corresponding to each subband group in the multiple subband groups, where the channel state information includes channel state information corresponding to at least one subband group and/or channel state information corresponding to each subband in the at least one subband group; and acquiring a channel state of the user equipment according to the feedback information.

With reference to any one of the third aspect or the foregoing possible implementation manners of the third aspect, in a fifth possible implementation manner of the third aspect, the processor is configured to invoke the program code stored in the memory to further perform the following operation: transmitting the CSI-RS in second bearer REs in each subband in each subband group to the user equipment through the network interface, where the second bearer REs are REs originally occupied by the CSI-RS and are different from the first bearer REs; where the reference signal corresponding to each subband group in the multiple subband groups and the CSI-RS transmitted by using the second bearer REs are transmitted in a same antenna direction.

With reference to any one of the third aspect or the foregoing possible implementation manners of the third aspect, in a sixth possible implementation manner of the third aspect, the processor is configured to invoke the program code stored in the memory to further perform the following operations: receiving, through the network interface, feedback information transmitted by the user equipment, where the feedback information includes channel state information obtained by the user equipment through estimation according to the reference signal corresponding to each subband group in the multiple subband groups and the CSI-RS transmitted in the second bearer REs, where the channel state information includes a CQI difference corresponding to each subband group and/or a CQI difference corresponding to each subband in each subband group; and acquiring a channel state of the user equipment according to the feedback information.

With reference to any one of the third aspect or the foregoing possible implementation manners of the third aspect, in a seventh possible implementation manner of the third aspect, the reference signals corresponding to the multiple subband groups and the CSI-RS transmitted in the second bearer REs are transmitted in different subframes.

With reference to any one of the third aspect or the foregoing possible implementation manners of the third aspect, in an eighth possible implementation manner of the third aspect, the reference signal corresponding to each subband group in the multiple subband groups and the CSI-RS transmitted in the second bearer REs are transmitted in a same subframe.

With reference to any one of the third aspect or the foregoing possible implementation manners of the third aspect, in a ninth possible implementation manner of the third aspect, the processor is configured to invoke the program code stored in the memory to further perform the following operation: transmitting the CSI-RS in third bearer REs through the network interface; where the reference signal corresponding to each subband group in the multiple subband groups is transmitted in a first antenna direction, the CSI-RS is transmitted in a second antenna direction, the third bearer REs are REs originally occupied by the CSI-RS, and the third bearer REs are different from the first bearer REs.

With reference to any one of the third aspect or the foregoing possible implementation manners of the third aspect, in a tenth possible implementation manner of the third aspect, the processor is configured to invoke the program code stored in the memory to further perform the following operations: receiving, through the network interface, feedback information transmitted by the user equipment, where the feedback information is channel state information obtained by the user equipment through estimation according to the reference signal corresponding to each subband group in the multiple subband groups and the CSI-RS transmitted in the third bearer REs; and acquiring a channel state of the user equipment according to the feedback information.

With reference to any one of the third aspect or the foregoing possible implementation manners of the third aspect, in an eleventh possible implementation manner of the third aspect, the channel state information includes a CQI in the first direction and corresponding to each subband group in at least one subband group, and/or includes at least one of a PMI, an RI, and a CQI in the second direction.

With reference to any one of the third aspect or the foregoing possible implementation manners of the third aspect, in a twelfth possible implementation manner of the third aspect, the processor is configured to invoke the program code stored in the memory to further perform the following operations: receiving, through the network interface, feedback information transmitted by the user equipment, where the feedback information includes channel state information obtained by the user equipment through estimation according to the reference signal corresponding to each subband group in the multiple subband groups; and acquiring a channel state of the user equipment according to the feedback information.

According to a fourth aspect, user equipment is provided and includes a network interface, a bus, a processor, and a memory, where the network interface is configured to implement communication connection to at least one other network element; the bus is configured to implement connection and communication between internal components of the user equipment; the memory is configured to store program code; and the processor is configured to invoke the program code stored in the memory to perform the following operations: receiving, in first bearer REs in each subband group in multiple subband groups through the network interface, a reference signal transmitted by a base station and corresponding to each subband group, where the multiple subband groups are obtained by dividing multiple physical resource blocks corresponding to REs originally occupied by a CSI-RS, the reference signal corresponding to each subband group in the multiple subband groups is generated by performing a precoding operation on the CSI-RS originally carried in the first bearer REs in each subband in each subband group, and different precoding is used when precoding operations are performed on the CSI-RS originally carried in the first bearer REs in different subband groups; obtaining channel state information through estimation according to the reference signal corresponding to each subband group in the multiple subband groups; and transmitting feedback information to the base station through the network interface, where the feedback information includes the channel state information.

With reference to the fourth aspect, in a first possible implementation manner of the fourth aspect, the CSI-RS is a CSI-RS defined in Release Rel-10 of an LTE protocol.

With reference to the fourth aspect or the foregoing first possible implementation manner of the fourth aspect, in a second possible implementation manner of the fourth aspect, each subband group in the multiple subband groups includes multiple subbands, and each subband includes one physical resource block or multiple continuous physical resource blocks in a frequency domain, where the multiple subbands included in each subband group are continuous in the frequency domain.

With reference to the fourth aspect or the foregoing first possible implementation manner of the fourth aspect, in a third possible implementation manner of the fourth aspect, each subband group in the multiple subband groups includes multiple subbands, and each subband includes one physical resource block or multiple continuous physical resource blocks in a frequency domain, where the multiple subbands included in each subband group are discrete in the frequency domain.

With reference to any one of the fourth aspect or the foregoing possible implementation manners of the fourth aspect, in a fourth possible implementation manner of the fourth aspect, the processor is configured to invoke the program code stored in the memory to specifically perform the following operation: obtaining the channel state information through estimation according to the reference signal corresponding to each subband group in the multiple subband groups, where the channel state information includes channel state information corresponding to at least one subband group in the multiple subband groups and/or channel state information corresponding to each subband in the at least one subband group.

With reference to any one of the fourth aspect or the foregoing possible implementation manners of the fourth aspect, in a fifth possible implementation manner of the fourth aspect, the processor is configured to invoke the program code stored in the memory to specifically perform the following operations: performing channel estimation on each physical resource block in each subband group to obtain a SINR corresponding to each physical resource block in each subband group; performing averaging processing on SINRs corresponding to all physical resource blocks in each subband group to obtain an SINR corresponding to each subband group; determining, according to the SINR corresponding to each subband group, the at least one subband group from the multiple subband groups, where an SINR corresponding to each subband group in the at least one subband group is greater than an SINR corresponding to other subband groups than the at least one subband group; and obtaining, according to the SINR corresponding to the at least one subband group, a CQI corresponding to the at least one subband group; where the channel state information includes the CQI corresponding to the at least one subband group.

With reference to any one of the fourth aspect or the foregoing possible implementation manners of the fourth aspect, in a sixth possible implementation manner of the fourth aspect, the processor is configured to invoke the program code stored in the memory to specifically perform the following operations: obtaining, according to an SINR value corresponding to a physical resource block of each subband in each subband group in the at least one subband group, an SINR value corresponding to each subband in each subband group in the at least one subband group; and obtaining, according to the SINR value corresponding to each subband in each subband group in the at least one subband group, a CQI corresponding to each subband in each subband group in the at least one subband group; where the channel state information further includes the CQI corresponding to each subband in the at least one subband group.

With reference to any one of the fourth aspect or the foregoing possible implementation manners of the fourth aspect, in a seventh possible implementation manner of the fourth aspect, the processor is configured to invoke the program code stored in the memory to perform the following operations: receiving, through the network interface, the CSI-RS transmitted by the base station by using second bearer REs in each subband in each subband group, where the second bearer REs are REs originally occupied by the CSI-RS and are different from the first bearer REs, where the reference signal corresponding to each subband group in the multiple subband groups and the CSI-RS transmitted by using the second bearer REs are transmitted in a same antenna direction; and obtaining the channel state information through estimation according to the reference signal corresponding to each subband group in the multiple subband groups and the CSI-RS received in the second bearer REs.

With reference to any one of the fourth aspect or the foregoing possible implementation manners of the fourth aspect, in an eighth possible implementation manner of the fourth aspect, the processor is configured to invoke the program code stored in the memory to specifically perform the following operations: obtaining, according to a channel estimation value obtained by performing channel estimation on the reference signal carried in the first bearer REs in each subband in each subband group in the multiple subband groups and a channel estimation value obtained by performing channel estimation on the reference signal carried in the second bearer REs in each subband, a channel estimation value difference corresponding to each subband in each subband group, where the channel estimation values are SINRs and the channel estimation value difference is an SINR difference, or the channel estimation values are CQIs and the channel estimation value difference is a CQI difference; performing averaging processing on channel estimation value differences corresponding to all subbands in each subband group to obtain a channel estimation value difference corresponding to each subband group; and determining at least one subband group according to the channel estimation value difference corresponding to each subband group, and determining the channel state information, where a channel estimation value difference of the at least one subband group is greater than channel estimation value differences of other subband groups, and the channel state information includes a CQI difference corresponding to each subband group in the at least one subband group.

With reference to any one of the fourth aspect or the foregoing possible implementation manners of the fourth aspect, in a ninth possible implementation manner of the fourth aspect, the channel state information further includes a CQI difference corresponding to each subband in each subband group in the at least one subband group.

With reference to any one of the fourth aspect or the foregoing possible implementation manners of the fourth aspect, in a tenth possible implementation manner of the fourth aspect, the reference signals corresponding to the multiple subband groups and the CSI-RS transmitted in the second bearer REs by the base station are received in different subframes.

With reference to any one of the fourth aspect or the foregoing possible implementation manners of the fourth aspect, in an eleventh possible implementation manner of the fourth aspect, the reference signal corresponding to each subband group in the multiple subband groups and the CSI-RS transmitted in the second bearer REs by the base station are received in a same subframe.

With reference to any one of the fourth aspect or the foregoing possible implementation manners of the fourth aspect, in a twelfth possible implementation manner of the fourth aspect, the processor is configured to invoke the program code stored in the memory to perform the following operations: receiving, in third bearer REs through the network interface, the CSI-RS transmitted by the base station, where the reference signal corresponding to each subband group in the multiple subband groups is transmitted in a first antenna direction by the base station, the CSI-RS is transmitted in a second antenna direction by the base station by using the third bearer REs, and the third bearer REs are REs originally occupied by the CSI-RS and are different from the first bearer REs; and obtaining the channel state information through estimation according to the reference signal corresponding to each subband group in the multiple subband groups and the CSI-RS received in the third bearer REs.

With reference to any one of the fourth aspect or the foregoing possible implementation manners of the fourth aspect, in a thirteenth possible implementation manner of the fourth aspect, the processor is configured to invoke the program code stored in the memory to specifically perform the following operations: obtaining, according to the reference signal corresponding to each subband group in the multiple subband groups, a CQI in the first direction and corresponding to each subband group in at least one subband group; and obtaining, according to the CSI-RS, at least one of a PMI, an RI, and a CQI in the second direction.

According to a fifth aspect, an information processing method is provided and includes: determining multiple subband groups, where the multiple subband groups are obtained by dividing multiple physical resource blocks corresponding to REs originally occupied by a CSI-RS, and each subband group in the multiple subband groups includes at least one subband; determining a reference signal corresponding to each subband group in the multiple subband groups, where the reference signal corresponding to each subband group is generated by performing a precoding operation on the CSI-RS originally carried in first bearer REs in each subband in each subband group, and different precoding is used when precoding operations are performed on the CSI-RS originally carried in the first bearer REs in different subband groups; and transmitting, by using the first bearer REs in each subband group in the multiple subband groups, the reference signal corresponding to each subband group.

With reference to the fifth aspect, in a first possible implementation manner of the fifth aspect, the CSI-RS is a CSI-RS defined in Release Rel-10 of an LTE protocol.

With reference to the fifth aspect or the foregoing first possible implementation manner of the fifth aspect, in a second possible implementation manner of the fifth aspect, each subband group in the multiple subband groups includes multiple subbands, and each subband includes one physical resource block or multiple continuous physical resource blocks in a frequency domain, where the multiple subbands included in each subband group are continuous in the frequency domain.

With reference to the fifth aspect or the foregoing first possible implementation manner of the fifth aspect, in a third possible implementation manner of the fifth aspect, each subband group in the multiple subband groups includes multiple subbands, and each subband includes one physical resource block or multiple continuous physical resource blocks in a frequency domain, where the multiple subbands included in each subband group are discrete in the frequency domain.

With reference to any one of the fifth aspect or the foregoing possible implementation manners of the fifth aspect, in a fourth possible implementation manner of the fifth aspect, the method further includes: receiving feedback information transmitted by the user equipment, where the feedback information is channel state information obtained by the user equipment according to the reference signal corresponding to each subband group in the multiple subband groups, where the channel state information includes channel state information corresponding to at least one subband group and/or channel state information corresponding to each subband in the at least one subband group; and acquiring a channel state of the user equipment according to the feedback information.

With reference to any one of the fifth aspect or the foregoing possible implementation manners of the fifth aspect, in a fifth possible implementation manner of the fifth aspect, the method further includes: transmitting the CSI-RS to the user equipment by using second bearer REs in each subband in each subband group, where the second bearer REs are REs originally occupied by the CSI-RS and are different from the first bearer REs; where the reference signal corresponding to each subband group in the multiple subband groups and the CSI-RS transmitted by using the second bearer REs are transmitted in a same antenna direction.

With reference to any one of the fifth aspect or the foregoing possible implementation manners of the fifth aspect, in a sixth possible implementation manner of the fifth aspect, the method further includes: receiving feedback information transmitted by the user equipment, where the feedback information includes channel state information obtained by the user equipment through estimation according to the reference signal corresponding to each subband group in the multiple subband groups and the CSI-RS transmitted in the second bearer REs, where the channel state information includes a CQI difference corresponding to each subband group and/or a CQI difference corresponding to each subband in each subband group; and acquiring a channel state of the user equipment according to the feedback information.

With reference to any one of the fifth aspect or the foregoing possible implementation manners of the fifth aspect, in a seventh possible implementation manner of the fifth aspect, the reference signals corresponding to the multiple subband groups and the CSI-RS transmitted in the second bearer REs are transmitted in different subframes.

With reference to any one of the fifth aspect or the foregoing possible implementation manners of the fifth aspect, in an eighth possible implementation manner of the fifth aspect, the reference signal corresponding to each subband group in the multiple subband groups and the CSI-RS transmitted in the second bearer REs are transmitted in a same subframe.

With reference to any one of the fifth aspect or the foregoing possible implementation manners of the fifth aspect, in a ninth possible implementation manner of the fifth aspect, the method further includes: transmitting the CSI-RS by using third bearer REs; where the reference signal corresponding to each subband group in the multiple subband groups is transmitted in a first antenna direction, the CSI-RS is transmitted in a second antenna direction, the third bearer REs are REs originally occupied by the CSI-RS, and the third bearer REs are different from the first bearer REs.

With reference to any one of the fifth aspect or the foregoing possible implementation manners of the fifth aspect, in a tenth possible implementation manner of the fifth aspect, the method further includes: receiving feedback information transmitted by the user equipment, where the feedback information is channel state information obtained by the user equipment through estimation according to the reference signal corresponding to each subband group in the multiple subband groups and the CSI-RS transmitted in the third bearer REs; and acquiring a channel state of the user equipment according to the feedback information.

With reference to any one of the fifth aspect or the foregoing possible implementation manners of the fifth aspect, in an eleventh possible implementation manner of the fifth aspect, the channel state information includes a CQI in the first direction and corresponding to each subband group in at least one subband group, and/or includes at least one of a PMI, an RI, and a CQI in the second direction.

With reference to any one of the fifth aspect or the foregoing possible implementation manners of the fifth aspect, in a twelfth possible implementation manner of the fifth aspect, the method further includes: receiving feedback information transmitted by the user equipment, where the feedback information includes channel state information obtained by the user equipment through estimation according to the reference signal corresponding to each subband group in the multiple subband groups; and acquiring a channel state of the user equipment according to the feedback information.

According to a sixth aspect, an information transmission method is provided and includes: receiving, in first bearer REs in each subband group in multiple subband groups, a reference signal transmitted by a base station and corresponding to each subband group, where the multiple subband groups are obtained by dividing multiple physical resource blocks corresponding to REs originally occupied by a CSI-RS, the reference signal corresponding to each subband group in the multiple subband groups is generated by performing a precoding operation on the CSI-RS originally carried in the first bearer REs in each subband in each subband group, and different precoding is used when precoding operations are performed on the CSI-RS originally carried in the first bearer REs in different subband groups; obtaining channel state information through estimation according to the reference signal corresponding to each subband group in the multiple subband groups; and transmitting feedback information to the base station, where the feedback information includes the channel state information.

With reference to the sixth aspect, in a first possible implementation manner of the sixth aspect, the CSI-RS is a CSI-RS defined in Release Rel-10 of an LTE protocol.

With reference to the sixth aspect or the foregoing first possible implementation manner of the sixth aspect, in a second possible implementation manner of the sixth aspect, each subband group in the multiple subband groups includes multiple subbands, and each subband includes one physical resource block or multiple continuous physical resource blocks in a frequency domain, where the multiple subbands included in each subband group are continuous in the frequency domain.

With reference to the sixth aspect or the foregoing first possible implementation manner of the sixth aspect, in a third possible implementation manner of the sixth aspect, each subband group in the multiple subband groups includes multiple subbands, and each subband includes one physical resource block or multiple continuous physical resource blocks in a frequency domain, where the multiple subbands included in each subband group are discrete in the frequency domain.

With reference to any one of the sixth aspect or the foregoing possible implementation manners of the sixth aspect, in a fourth possible implementation manner of the sixth aspect, the obtaining channel state information through estimation according to the reference signal corresponding to each subband group in the multiple subband groups includes: obtaining the channel state information through estimation according to the reference signal corresponding to each subband group in the multiple subband groups, where the channel state information includes channel state information corresponding to at least one subband group in the multiple subband groups and/or channel state information corresponding to each subband in the at least one subband group.

With reference to any one of the sixth aspect or the foregoing possible implementation manners of the sixth aspect, in a fifth possible implementation manner of the sixth aspect, the obtaining channel state information through estimation according to the reference signal corresponding to each subband group in the multiple subband groups includes: performing channel estimation on each physical resource block in each subband group to obtain a SINR corresponding to each physical resource block in each subband group; performing averaging processing on SINRs corresponding to all physical resource blocks in each subband group to obtain an SINR corresponding to each subband group; determining, according to the SINR corresponding to each subband group, the at least one subband group from the multiple subband groups, where an SINR corresponding to each subband group in the at least one subband group is greater than an SINR corresponding to other subband groups than the at least one subband group; and obtaining, according to the SINR corresponding to the at least one subband group, a CQI corresponding to the at least one subband group; where the channel state information includes the CQI corresponding to the at least one subband group.

With reference to any one of the sixth aspect or the foregoing possible implementation manners of the sixth aspect, in a sixth possible implementation manner of the sixth aspect, the obtaining channel state information through estimation according to the reference signal corresponding to each subband group in the multiple subband groups includes: obtaining, according to an SINR value corresponding to a physical resource block of each subband in each subband group in the at least one subband group, an SINR value corresponding to each subband in each subband group in the at least one subband group; and obtaining, according to the SINR value corresponding to each subband in each subband group in the at least one subband group, a CQI corresponding to each subband in each subband group in the at least one subband group; where the channel state information further includes the CQI corresponding to each subband in the at least one subband group.

With reference to any one of the sixth aspect or the foregoing possible implementation manners of the sixth aspect, in a seventh possible implementation manner of the sixth aspect, the method further includes: receiving the CSI-RS transmitted by the base station by using second bearer REs in each subband in each subband group, where the second bearer REs are REs originally occupied by the CSI-RS and are different from the first bearer REs, where the reference signal corresponding to each subband group in the multiple subband groups and the CSI-RS transmitted by using the second bearer REs are transmitted in a same antenna direction by the base station; and the obtaining channel state information through estimation according to the reference signal corresponding to each subband group in the multiple subband groups includes: obtaining the channel state information through estimation according to the reference signal corresponding to each subband group in the multiple subband groups and the CSI-RS received in the second bearer REs.

With reference to any one of the sixth aspect or the foregoing possible implementation manners of the sixth aspect, in an eighth possible implementation manner of the sixth aspect, the obtaining the channel state information through estimation according to the reference signal corresponding to each subband group in the multiple subband groups and the CSI-RS received in the second bearer REs includes: obtaining, according to a channel estimation value obtained by performing channel estimation on the reference signal carried in the first bearer REs in each subband in each subband group in the multiple subband groups and a channel estimation value obtained by performing channel estimation on the CSI-RS carried in the second bearer REs in each subband, a channel estimation value difference corresponding to each subband in each subband group, where the channel estimation values are SINRs and the channel estimation value difference is a signal to interference plus noise ratio (SINR) difference, or the channel estimation values are CQIs and the channel estimation value difference is a CQI difference; performing averaging processing on channel estimation value differences corresponding to all subbands in each subband group to obtain a channel estimation value difference corresponding to each subband group; and determining at least one subband group according to the channel estimation value difference corresponding to each subband group, and determining the channel state information, where a channel estimation value difference of the at least one subband group is greater than channel estimation value differences of other subband groups, and the channel state information includes a CQI difference corresponding to each subband group in the at least one subband group.

With reference to any one of the sixth aspect or the foregoing possible implementation manners of the sixth aspect, in a ninth possible implementation manner of the sixth aspect, the channel state information further includes a CQI difference corresponding to each subband in each subband group in the at least one subband group.

With reference to any one of the sixth aspect or the foregoing possible implementation manners of the sixth aspect, in a tenth possible implementation manner of the sixth aspect, the reference signals corresponding to the multiple subband groups and the CSI-RS transmitted in the second bearer REs by the base station are received in different subframes.

With reference to any one of the sixth aspect or the foregoing possible implementation manners of the sixth aspect, in an eleventh possible implementation manner of the sixth aspect, the reference signal corresponding to each subband group in the multiple subband groups and the CSI-RS transmitted in the second bearer REs by the base station are received in a same subframe.

With reference to any one of the sixth aspect or the foregoing possible implementation manners of the sixth aspect, in a twelfth possible implementation manner of the sixth aspect, the method further includes: receiving, in third bearer REs, the CSI-RS transmitted by the base station, where the reference signal corresponding to each subband group in the multiple subband groups is transmitted in a first antenna direction by the base station, the CSI-RS is transmitted in a second antenna direction by the base station by using the third bearer REs, and the third bearer REs are REs originally occupied by the CSI-RS and are different from the first bearer REs; and the obtaining channel state information through estimation according to the reference signal corresponding to each subband group in the multiple subband groups includes: obtaining the channel state information through estimation according to the reference signal corresponding to each subband group in the multiple subband groups and the CSI-RS received in the third bearer REs.

With reference to any one of the sixth aspect or the foregoing possible implementation manners of the sixth aspect, in a thirteenth possible implementation manner of the sixth aspect, the obtaining the channel state information through estimation according to the reference signal corresponding to each subband group in the multiple subband groups and the CSI-RS received in the third bearer REs includes: obtaining, according to the reference signal corresponding to each subband group in the multiple subband groups, a CQI in the first direction and corresponding to each subband group in at least one subband group; and obtaining, according to the CSI-RS, at least one of a PMI, an RI, and a CQI in the second direction.

Therefore, in the embodiments, on a basis of REs originally occupied by a CSI-RS, multiple subband groups are obtained by dividing physical resource blocks corresponding to the REs occupied by the CSI-RS; a reference signal corresponding to each subband group is obtained by performing a precoding operation on a CSI-RS originally carried in first bearer REs in each subband in each subband group, and different precoding is used when precoding operations are performed on the CSI-RS originally carried in the first bearer REs in different subband groups; and the reference signal corresponding to each subband group in the multiple subband groups is transmitted by using the first bearer REs in each subband group. Because different precoding is used when precoding operations are performed on the CSI-RS originally carried in the first bearer REs in different subband groups, reference signals corresponding to different subband groups may correspond to different antenna ports. Therefore, without increasing resource consumption, a quantity of antenna ports can be increased, and more transmit antennas can be supported. In addition, because new resources are not used, backward compatibility with legacy UE can be achieved.

BRIEF DESCRIPTION OF THE DRAWINGS

To describe the technical solutions in the embodiments more clearly, the following briefly describes the accompanying drawings required for describing the embodiments or the prior art. Apparently, the accompanying drawings in the following description show merely some embodiments, and a person of ordinary skill in the art may still derive other drawings from these accompanying drawings without creative efforts.

FIG. 1 is a schematic flowchart of an information transmission method according to an embodiment;

FIG. 2a and FIG. 2b are diagrams of signals carried in physical resource blocks in the prior art;

FIG. 4 is a schematic flowchart of an information transmission method according to an embodiment;

FIG. 9 is a schematic flowchart of an information transmission method according to an embodiment;

DETAILED DESCRIPTION OF ILLUSTRATIVE EMBODIMENTS

Figure 2B:

The following clearly describes the technical solutions in the embodiments with reference to the accompanying drawings in the embodiments. Apparently, the described embodiments are some but not all of the embodiments. All other embodiments obtained by a person of ordinary skill in the art based on the embodiments without creative efforts shall fall within the protection scope.

FIG. 1 is a schematic flowchart of an information processing method 100 according to an embodiment. As shown in FIG. 1, the method 100 includes.

S110. Determine multiple subband groups, where the multiple subband groups are obtained by dividing multiple physical resource blocks corresponding to resource elements (REs) originally occupied by a channel state information reference signal (CSI-RS), each subband group in the multiple subband groups includes at least one subband, and each subband includes at least one physical resource block (PRB), where the multiple physical resource blocks corresponding to the resource elements originally occupied by the CSI-RS may be all physical resource blocks corresponding to the resource elements occupied by the CSI-RS, or may be some physical resource blocks corresponding to the resource elements occupied by the CSI-RS.

S120. Determine a reference signal corresponding to each subband group in the multiple subband groups, where the reference signal corresponding to each subband group is generated by performing a precoding operation on a CSI-RS originally carried in first bearer REs in each subband in each subband group, and different precoding is used when precoding operations are performed on the CSI-RS originally carried in the first bearer REs in different subband groups.

S130. Transmit, by using the first bearer REs in each subband group in the multiple subband groups, the reference signal corresponding to each subband group in the multiple subband groups.

Specifically, multiple subband groups may be obtained by dividing all or some physical resource blocks corresponding to REs occupied by CSI-RS corresponding to an antenna port, where each subband group may include at least one subband, and each subband may include at least one physical resource block; a reference signal corresponding to each subband group in the multiple subband groups is determined, where the reference signal corresponding to each subband group may be obtained by performing a precoding operation on a CSI-RS originally carried in first bearer REs in each subband in each subband group, and different precoding is used (that is, different precoding vectors or matrices are used) when precoding operations are performed on the CSI-RS originally carried in the first bearer REs in different subband groups; after the reference signal corresponding to each subband group in the multiple subband groups is determined, the reference signal corresponding to each subband group in the multiple subband groups may be transmitted by using the first bearer REs in each subband group in the multiple subband groups. The CSI-RS originally carried in the bearer REs refers to a CSI-RS carried in the REs in the prior art.

It should be understood that, in this embodiment, the reference signal corresponding to each subband group in the multiple subband groups may be preconfigured, where the preconfigured reference signal corresponding to each subband group in the multiple subband groups may also be generated based on the following principle: The reference signal corresponding to each subband group is obtained by performing a precoding operation on the CSI-RS originally carried in the first bearer REs in each subband in each subband group, and different precoding is used when precoding operations are performed on the CSI-RS originally carried in the first bearer REs in different subband groups.

It should also be understood that, in this embodiment, each subband included in the multiple subband groups may also be preconfigured, where the subbands included in the multiple subband groups are also preconfigured based on the following principle: The multiple subband groups are obtained by dividing multiple physical resource blocks corresponding to the REs originally occupied by the CSI-RS, each subband group in the multiple subband groups includes at least one subband, and each subband includes at least one physical resource block.

Therefore, in this embodiment, on a basis of REs originally occupied by a CSI-RS, multiple subband groups are obtained by dividing physical resource blocks corresponding to the REs occupied by the CSI-RS; a reference signal corresponding to each subband group is obtained by performing a precoding operation on a CSI-RS originally carried in first bearer REs in each subband in each subband group, and different precoding is used when precoding operations are performed on the CSI-RS originally carried in the first bearer REs in different subband groups; and the reference signal corresponding to each subband group in the multiple subband groups is transmitted by using the first bearer REs in each subband group. Because different precoding is used when precoding operations are performed on the CSI-RS originally carried in the first bearer REs in different subband groups, reference signals corresponding to different subband groups may correspond to different antenna ports. Therefore, without increasing resource consumption, a quantity of antenna ports can be increased, and more transmit antennas can be supported. In addition, because new resources are not used, backward compatibility with legacy user equipment (UE) can be achieved.

Optionally, the CSI-RS in this embodiment may be a CSI-RS defined in Release Rel-10, of an LTE protocol.

In this embodiment, a physical resource block corresponding to REs originally occupied by a CSI-RS means that, as long as a base station transmits the CSI-RS in some REs in a certain physical resource block in the prior art, it may be considered that the physical resource block is a physical resource block corresponding to the REs originally occupied by the CSI-RS.

FIG. 2a shows a case of signal transmission in a physical resource block in a subframe (including 12 subcarriers in a frequency domain or including 14 orthogonal frequency division multiplexing (OFDM) symbols in a time domain) in the prior art. As shown in FIG. 2, in the physical resource block, not only a CSI-RS is transmitted, but also a physical downlink control channel (PDCCH), a signal corresponding to a CRS port, and a signal corresponding to a demodulation reference signal (DM-RS) port are transmitted. However, the physical resource block may be still referred to as a physical resource block corresponding to the REs originally occupied by the CSI-RS. Although FIG. 2 does not specifically show the CSI-RS port that the REs occupied by the CSI-RS corresponds to, it should be understood that, in a physical resource block, one CSI-RS may be transmitted, or multiple CSI-RSs may be transmitted.

FIG. 2b shows resource elements occupied by a CSI-RS port 16 in a subframe with an extended cyclic prefix (CP) in the prior art, where a first bearer RE may be an RE corresponding to a fifth OFDM (l=4) symbol and a first subcarrier, or may be an RE corresponding to the sixth OFDM symbol (l=5) and a first subcarrier, or may include an RE corresponding to a fifth OFDM symbol and a first subcarrier and an RE corresponding to the sixth OFDM symbol and the first subcarrier.

Optionally, in this embodiment, that different precoding is used when precoding operations are performed on the CSI-RS originally carried in the first bearer REs in different subband groups may be that precoding pointing to different spatial directions is used, where the precoding may be a precoding vector or may be a precoding matrix or the like.

In this embodiment, for a uniform linear array (ULA) having K antenna array elements, there may be multiple methods for obtaining precoding vectors that point to different spatial directions. A description method having a general meaning is an expression manner shown by a formula (1):

$$P_i(m) = \frac{1}{\sqrt{K}} e^{j\frac{2\pi(m-1)\cos(\alpha_i)}{\lambda/d}}, m = 1, \ldots, K \quad (1)$$

where $P_i$ indicates the $i^{th}$ spatial precoding vector, $P_i(m)$ is a weighting factor in the vector and mapped to the $m^{th}$ antenna array element, K indicates a quantity of antenna array elements, $\lambda$ indicates a wavelength of a transmit signal, $\alpha_i$ indicates an angle that points to the $i^{th}$ spatial direction, and d indicates a spacing between antennas.

It should be understood that, for the uniform linear array having K antenna array elements, the formula (1) shows how to obtain K precoding vectors that point to different spatial directions. Certainly, for the uniform linear array having K antenna array elements, less than K precoding vectors that point to different spatial directions may also be obtained.

Figure 3A:
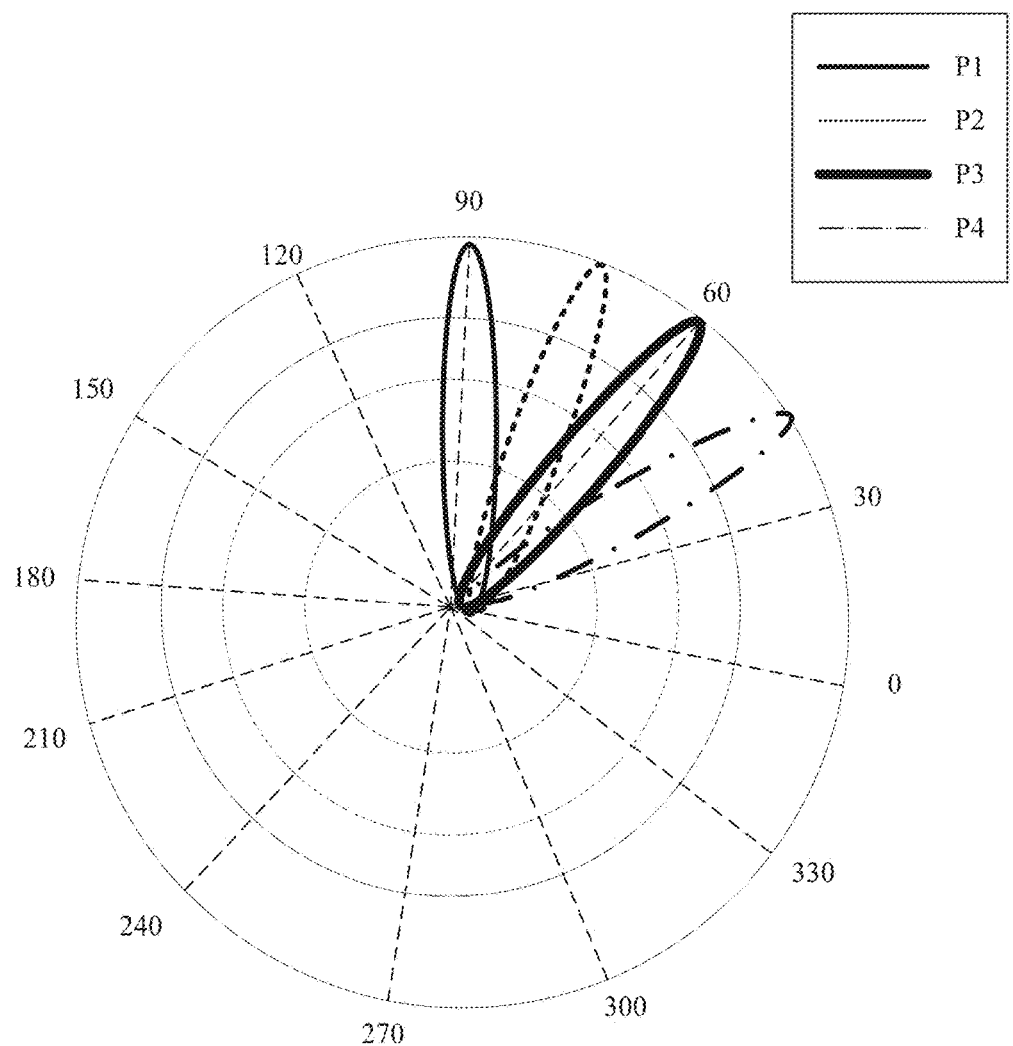
FIG. 3a to FIG. 3c are antenna patterns of eight array elements, formed by precoding vectors that point to four different spatial directions.
Figure 3B:
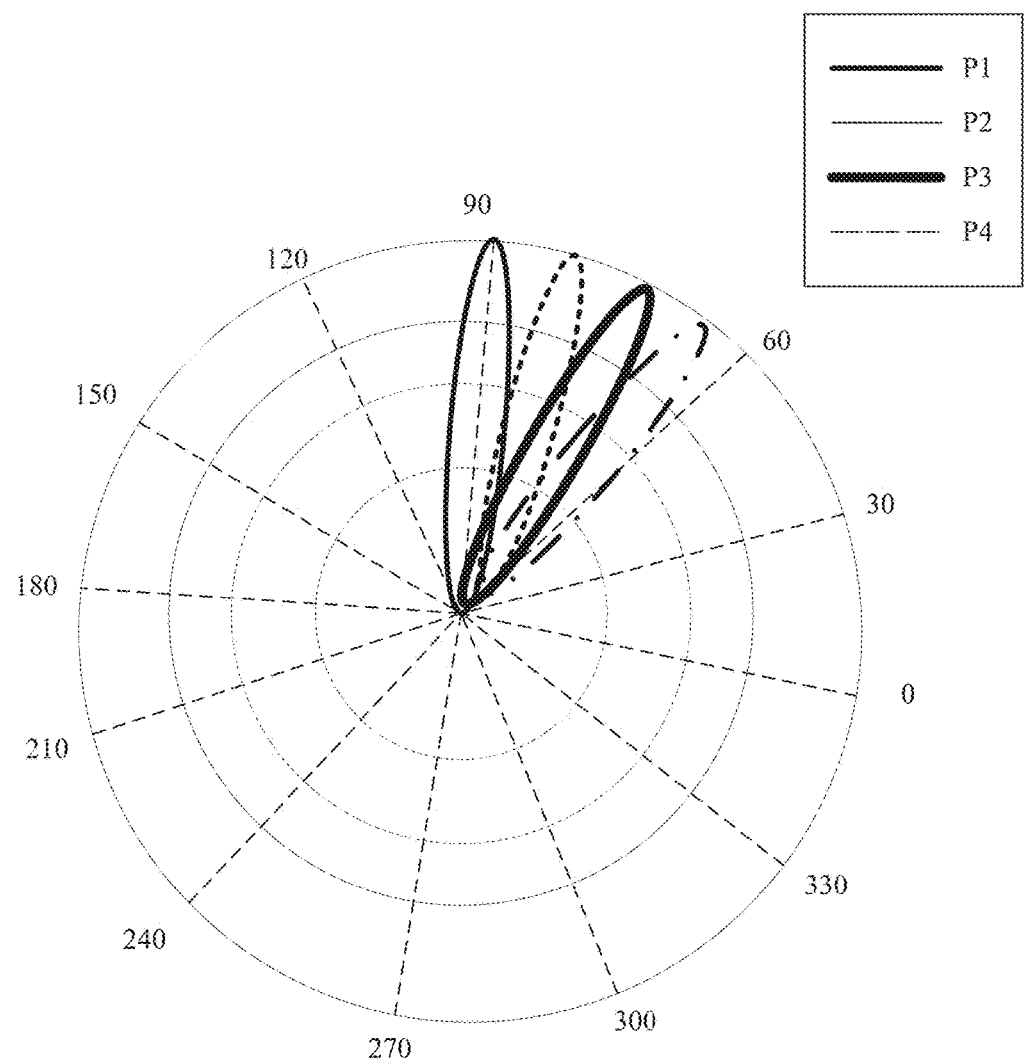
Figure 3C:
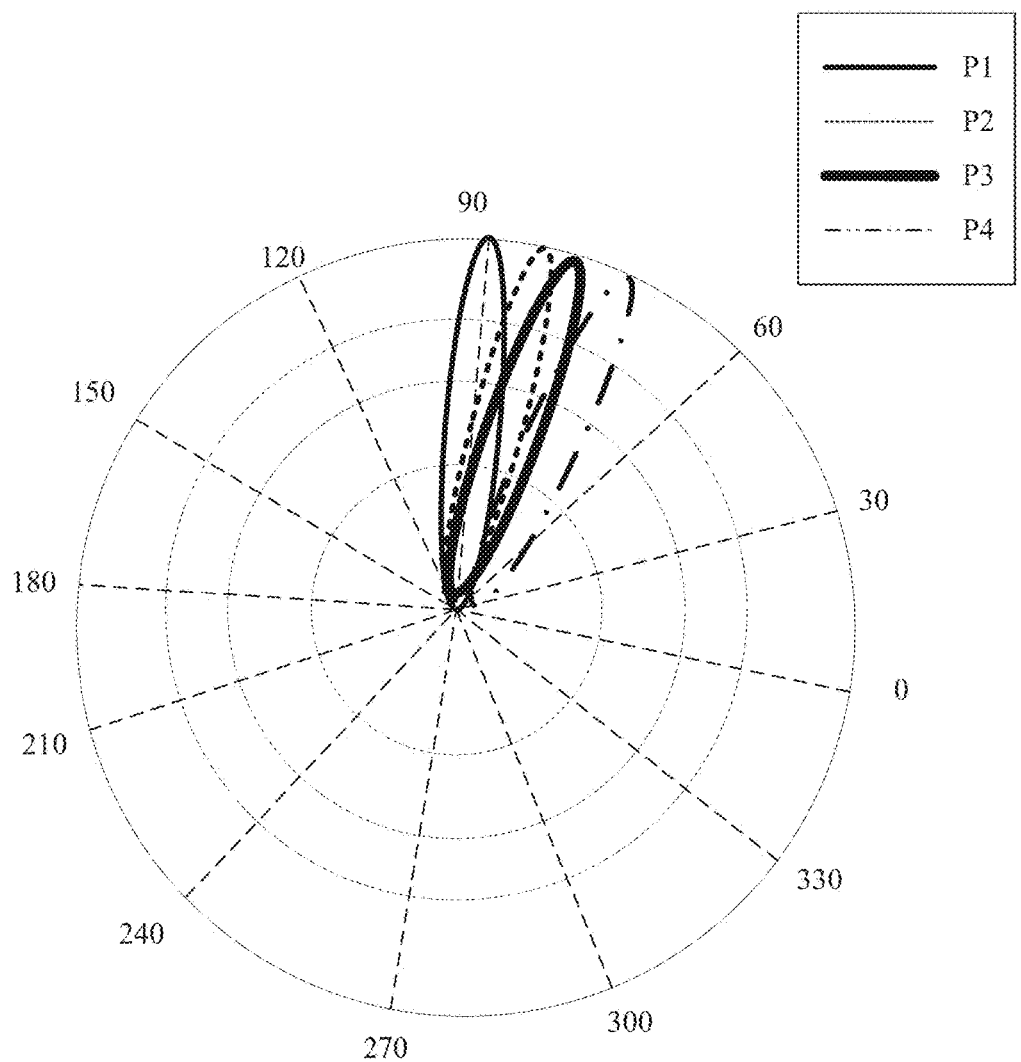

FIG. 3a to FIG. 3c show antenna patterns of eight array elements, formed by precoding vectors that point to four different spatial directions. As can be seen from FIG. 3a to FIG. 3c, spatial beams with different spatial directions may be obtained by adjusting a precoding vector (for example, by adjusting $\alpha_i$). FIG. 3a is a polar-coordinate antenna pattern of eight array elements that point to four directions sparsely; FIG. 3b is a polar-coordinate antenna pattern of eight array elements that point to four directions relatively densely; FIG. 3c is a polar-coordinate antenna pattern of eight array elements that point to four directions densely.

Optionally, in this embodiment, in addition to the use of a precoding vector described above, for four antenna array elements and eight antenna array elements, codebooks of four antennas and eight antennas in LTE may also be used to select to point to different spatial directions. It should be understood that, the precoding in this embodiment may include the precoding vector represented by the formula (1)

or may include a codebook in the existing LTE protocol. It should also be understood that, as a citation to the prior art, use of other precoding vectors for generating a reference signal corresponding to a subband group is not limited in embodiments.

Optionally, in this embodiment, as shown in FIG. 4, the method 100 may further include.

S140. Receive feedback information transmitted by user equipment, where the feedback information is channel state information obtained by the user equipment through estimation according to the reference signal corresponding to each subband group in the multiple subband groups.

S150. Acquire a channel state of the user equipment according to the feedback information.

Specifically, after the user equipment receives the reference signal corresponding to each subband group in the multiple subband groups and transmitted by the base station, the user equipment may obtain the channel state information by performing channel estimation according to the reference signal corresponding to each subband group in the multiple subband groups and transmitted by the base station, and then transmit, to the base station by using the feedback information, the channel state information obtained through channel estimation according to the reference signal corresponding to each subband group in the multiple subband groups; the base station may acquire the channel state of the user equipment according to the feedback information, and therefore may further perform transmission scheduling of a downlink traffic channel according to the channel state of the user equipment.

In this embodiment, there may be multiple implementation manners for dividing the physical resource blocks corresponding to the REs originally occupied by the CSI-RS into subbands and subband groups, and transmitting the CSI-RS by using the REs originally occupied by the CSI-RS, or transmitting the CSI-RS and the reference signal corresponding to each subband group in the multiple subband groups. The implementation manners are hereinafter described in detail with reference to several embodiments.

Embodiment A

In this embodiment, each subband group in the multiple subband groups includes multiple subbands, and each subband includes one physical resource block or multiple continuous physical resource blocks in the frequency domain, where the multiple subbands included in each subband group are discrete in the frequency domain.

Figure 5:
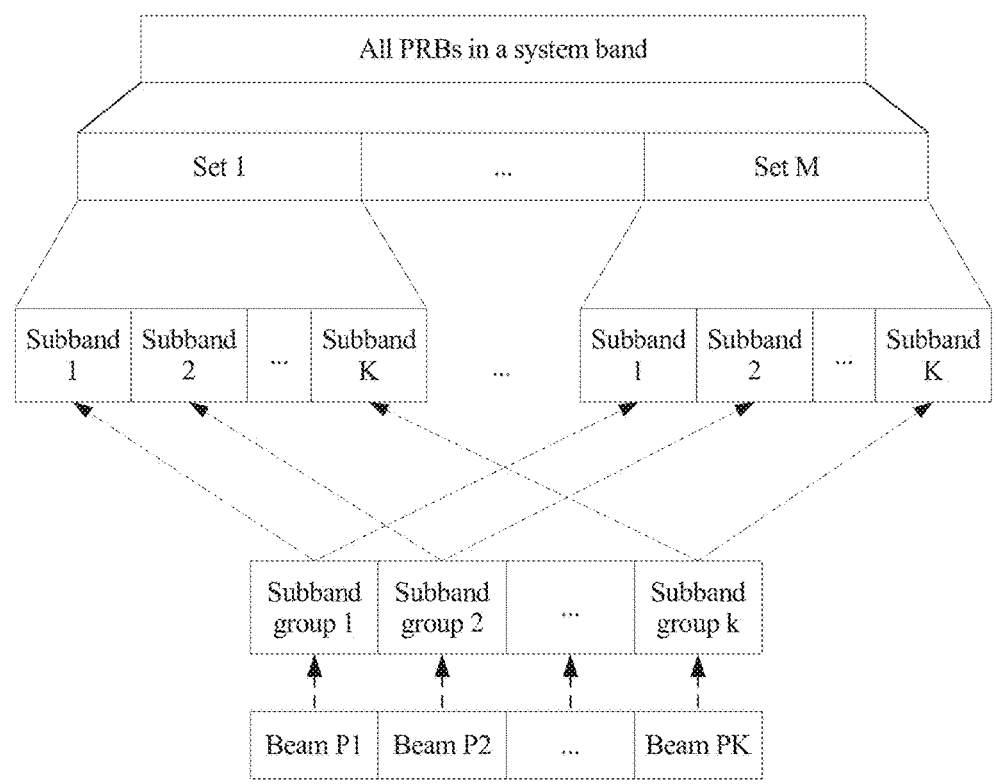
FIG. 5 is a diagram of a resource division manner according to an embodiment.

For example, as shown in FIG. 5, multiple physical resource blocks (in FIG. 5, all physical resource blocks corresponding to resource elements occupied by CSI-RS (all the physical resource blocks are all PRBs in a system bandwidth) are used as an example for description) corresponding to resource elements occupied by CSI-RS corresponding to a certain antenna port may be divided into M physical resource block sets, where physical resource blocks included in each physical resource block set are continuous in the frequency domain; each physical resource block set is divided into K subbands, where each subband may include one physical resource block or multiple continuous physical resource blocks in the frequency domain, and the $i^{th}$ subbands in all physical resource block sets may constitute the $i^{th}$ subband group, where a value of i ranges from 1 to K; then, different beams may be allocated to each subband group, that is, different precoding vectors or matrices are used to perform precoding operations on the CSI-RS originally carried in each subband group, or in other words, different precoding vectors or matrices are used to perform weighting processing on an antenna array element corresponding to each subband group.

It should be understood that, in FIG. 5, only a case in which multiple subbands included in each subband group are discrete in the frequency domain is described by using an example. A resource division manner in this embodiment should not be limited, and other resource division manners may also be available in this embodiment. For example, in FIG. 5, a quantity of subbands included in each physical resource block set is not exactly the same, and therefore, a quantity of subbands included in a subband group is also not exactly the same.

The following uses an LTE system with a system bandwidth of 20 MHz as an example to describe a manner of dividing the physical resource blocks corresponding to the REs originally occupied by the CSI-RS in this embodiment, where there are 100 PRBs in total in the LTE system with the system bandwidth of 20 MHz, and there is a CSI-RS signal in all the 100 PRBs. Specifically, the following uses an example to describe how to divide the PRBs into subband groups. For ease of description, the following also introduces a concept of a physical resource block set, which is referred to as a set for short.

Division manner 1: The system bandwidth of 100 PRBs may be divided into eight subband groups. The 100 PRBs are divided into 13 sets; the first 12 sets each include eight PRBs, where each set is divided into eight subbands, and each subband includes one PRB; the 13th set has four PRBs and is divided into four subbands, where each subband includes one PRB. Therefore, a subband group 1 may include a first subband of each set in set 1 to set 13; a subband group 2 may include a second subband of each set in set 1 to set 13; a subband group 3 may include a third subband of each set in set 1 to set 13; a subband group 4 may include a fourth subband of each set in set 1 to set 13. Because the 13th set includes only four PRBs, a subband group 5 includes a fifth subband of each set in set 1 to set 12; a subband group 6 includes a sixth subband of each set in set 1 to set 12; a subband group 7 includes a seventh subband of each set in set 1 to set 12; and a subband group 8 includes an eighth subband of each set in set 1 to set 12.

Division manner 2: The system bandwidth of 100 PRBs may be divided into four subband groups. The system bandwidth of 100 PRBs is divided into 13 sets; each set in the first 12 sets includes eight PRBs, where each set includes four subbands, and each subband includes two PRBs; the 13th set has four PRBs and includes four subbands, where each subband includes one PRB. Therefore, a subband group 1 includes a first subband (including two PRBs) of each set in set 1 to set 12 and a first subband (including one PRB) of set 13; a subband group 2 includes a second subband (including two PRBs) of each set in set 1 to set 12 and a second subband (including one PRB) of set 13; a subband group 3 includes a third subband (including two PRBs) of each set in set 1 to set 12 and a third subband (including one PRB) of set 13; a subband group 4 includes a fourth subband (including two PRBs) of each set in set 1 to set 12 and a fourth subband (including one PRB) of set 13.

Division manner 3: The system bandwidth of 100 PRBs may be divided into eight subband groups. The system bandwidth of 100 PRBs is divided into 12 sets, where each set includes eight PRBs, and the last four PRBs are discarded. Therefore, each set may include 12 subbands, where each subband includes one physical resource block. Therefore, a subband group 1 may include a first subband of each set in set 1 to set 12; a subband group 2 may include a second subband of each set in set 1 to set 12, and so on.

It should be understood that, the foregoing division manners are only specific implementation manners and should not constitute any limitation to the embodiments.

The foregoing has described in detail how to divide the physical resource blocks corresponding to the REs originally occupied by the CSI-RS. The following describes a processing behavior of the user equipment in this case after the user equipment receives the reference signal corresponding to each subband group and transmitted by the base station by using the first REs in each subband group in the multiple subband groups.

Specifically, the user equipment may perform channel estimation on each physical resource block in each subband group to obtain an SINR corresponding to each frequency domain physical resource block in each subband group; perform averaging processing on SINRs corresponding to all physical resource blocks in each subband group to obtain an SINR corresponding to each subband group; determine, according to the SINR corresponding to each subband group, at least one subband group from the multiple subband groups, where an SINR corresponding to each subband group in the at least one subband group is greater than an SINR corresponding to other subband groups than the at least one subband group; obtain, according to the SINR corresponding to the at least one subband group, a channel quality indicator (CQI) corresponding to the at least one subband group; and feed back, to the base station, the CQI corresponding to the at least one subband group. Specifically, the user equipment may feed back a subband group index value of the at least one subband group and a corresponding CQI value.

Preferably, the user equipment may determine one subband group from the multiple subband groups, where an SINR corresponding to the one subband group is greater than an SINR corresponding to any other subband group; obtain, according to the SINR corresponding to the one subband group, a CQI corresponding to the one subband group; and feed back, to the base station, the CQI corresponding to the one subband group. Specifically, the user equipment may feed back a subband group index value of the one subband group and a corresponding CQI value.

Optionally, the user equipment may further obtain, according to an SINR value corresponding to a physical resource block of each subband in each subband group in the at least one subband group, an SINR value corresponding to each subband in each subband group in the at least one subband group; obtain, according to the SINR value corresponding to each subband in each subband group in the at least one subband group, a CQI corresponding to each subband in each subband group in the at least one subband group; and feed back, to the base station, the CQI corresponding to each subband in each subband group in the at least one subband group. Specifically, the user equipment may feed back an index value of each subband in the at least one subband group and a corresponding CQI value.

After receiving the CQI value corresponding to the at least one subband group and fed back by the user equipment, the base station may determine a spatial position in a corresponding direction of a uniform linear array in which the user equipment is located, and determine signal strength in the position. Therefore, the base station may perform transmission scheduling of the downlink traffic channel according to information of the spatial position of the user equipment (namely, the specific spatial position and strength).

If the user equipment further feeds back, to the base station, the CQI of each subband in each subband group in the at least one subband group, the base station may perform scheduling for the user equipment with reference to both the CQI value corresponding to the at least one subband group and the CQI corresponding to each subband in the at least subband group. In this way, the channel state can be better used, and system performance can be improved. This is because the subbands included in each subband group are discrete in the frequency domain, but the CQI corresponding to the at least one subband group and determined by the user equipment is obtained from an average SINR of physical resource blocks included in the discrete subbands, and therefore can reflect a channel state of the entire system bandwidth; however, the user equipment feeds back, to the base station, the CQI corresponding to the subband included in each subband group in the at least one subband group, and the CQI can reflect a channel state corresponding to the subband because the CQI corresponding to the subband is obtained through channel estimation according to the reference signal carried in the subband.

Embodiment B

In this embodiment, each subband group in the multiple subband groups includes multiple subbands, and each subband includes one physical resource block or multiple continuous physical resource blocks in the frequency domain, where the multiple subbands included in each subband group are continuous in the frequency domain.

Figure 6:
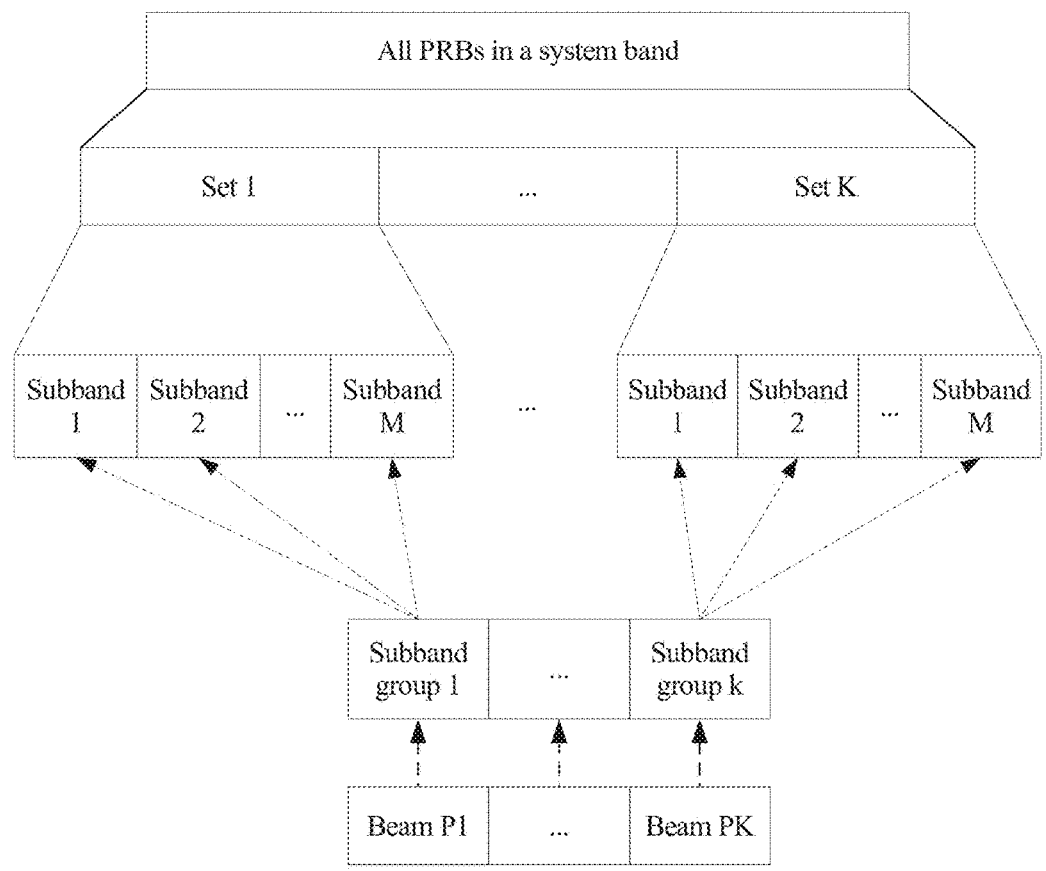
FIG. 6 is a diagram of another resource division manner according to an embodiment.

For example, as shown in FIG. 6, multiple physical resource blocks (in FIG. 6, all physical resource blocks corresponding to resource elements occupied by CSI-RS (all the physical resource blocks are all PRBs in a system bandwidth) are used as an example for description) corresponding to resource elements originally occupied by CSI-RS corresponding to a certain antenna port may be divided into K physical resource block sets, where physical resource blocks included in each physical resource block set are continuous in the frequency domain; each physical resource block set is divided into M subbands, where each subband may include one physical resource block or multiple continuous physical resource blocks in the frequency domain; therefore, all subbands in each set may be allocated to a subband group, and multiple subbands included in each subband group can be continuous in the frequency domain; then different beams may be allocated to each subband group, that is, different precoding vectors or matrices are used to perform precoding operations on the CSI-RS originally carried in each subband group, or in other words, different precoding vectors or matrices are used to perform weighting processing on an antenna array element corresponding to each subband group.

The following uses an LTE system with a system bandwidth of 20 MHz as an example to describe a case in which physical resource blocks included in each subband group are continuous. There are 100 PRBs in total in the LTE system with the system bandwidth of 20 MHz, and there are CSI-RS signals in all the 100 PRBs. Specifically, the following uses an example to describe how to divide the PRBs into subband groups.

The 100 PRBs are divided into 13 sets, where sizes of different sets may be equal or may be unequal. For example, the 100 PRBs may be divided into 13 sets, where sizes of the first 12 sets are eight PRBs, and a size of the 13th set is four PRBs; certainly, the 100 PRBs may also be divided into 12 sets, where sizes of the first 11 sets are eight PRBs, and a size of the twelfth set is 12 PRBs; or the 100 PRBs may be divided into eight sets, where sizes of the first seven sets are 12 PRBs, and a size of the eighth set is 16 PRBs. How to divide the entire system bandwidth depends on a size of the entire system band and a quantity of antenna ports that need to be supported. Then it may be determined that all subbands in each set constitute a subband group. When subband division is performed on each set, a subband may include one physical resource block or may include multiple physical resource blocks. Quantities of subbands in different sets may be equal or unequal, and quantities of physical resource blocks included in different subbands in any set may be equal or unequal.

The foregoing has described in detail a manner of dividing physical resource blocks that are continuously distributed in the frequency domain and included in the subband group. The following describes a processing behavior of the user equipment in this case after the user equipment receives the reference signal corresponding to each subband group and transmitted by the base station by using each subband group in the multiple subband groups.

Specifically, the user equipment may perform channel estimation on each physical resource block in each subband group to obtain an SINR corresponding to each physical resource block in each subband group; perform averaging processing on SINRs corresponding to all physical resource blocks in each subband group to obtain an SINR corresponding to each subband group; determine, according to the SINR corresponding to each subband group, at least one subband group from the multiple subband groups, where an SINR corresponding to each subband group in the at least one subband group is greater than an SINR corresponding to other subband groups than the at least one subband group; obtain, according to the SINR corresponding to the at least one subband group, a CQI corresponding to the at least one subband group; and feed back, to the base station, the CQI corresponding to the at least one subband group. Specifically, the user equipment may feed back a subband group index value of the at least one subband group and a corresponding CQI value.

Preferably, the user equipment may determine one subband group from the multiple subband groups, where an SINR corresponding to the one subband group is greater than an SINR corresponding to any other subband group; obtain, according to the SINR corresponding to the one subband group, a CQI corresponding to the one subband group; and feed back, to the base station, the CQI corresponding to the one subband group. Specifically, the user equipment may feed back a subband group index value of the one subband group and a corresponding CQI value.

Optionally, the user equipment may further obtain, according to an SINR value corresponding to a physical resource block of each subband in each subband group in the at least one subband group, an SINR value corresponding to each subband in each subband group in the at least one subband group; obtain, according to the SINR value corresponding to each subband in each subband group in the at least one subband group, a CQI corresponding to each subband in each subband group in the at least one subband group; and feed back, to the base station, the CQI corresponding to each subband in each subband group in the at least one subband group. Specifically, the user equipment may feed back an index value of each subband in the at least one subband group and a corresponding CQI value.

After receiving the CQI value corresponding to the at least one subband group and fed back by the user equipment, the base station determines a spatial position in a corresponding direction of a uniform linear array in which the user equipment is located, and determines signal strength in the position. Therefore, the base station may perform transmission scheduling of the downlink traffic channel according to information of the spatial position of the user equipment (namely, the specific spatial position and strength).

If the user equipment further feeds back, to the base station, the CQI of each subband in each subband group in the at least one subband group, the base station may perform scheduling for the user equipment with reference to both the CQI value corresponding to the at least one subband group and the CQI corresponding to each subband in the at least subband group. In this way, the channel state can be better used, and system performance can be improved. This is because a frequency domain range of the subband group is large, and a CQI obtained from an average SINR of physical resource blocks included in the subband group may reflect channel states in a large frequency domain range; however, the user equipment feeds back, to the base station, the CQI corresponding to the subband included in each subband group in the at least one subband group, and the CQI can reflect channel states in a relatively small frequency domain range because a frequency domain range of the subband is relatively small and the CQI is obtained through channel estimation according to the reference signal carried in the subband.

The foregoing has described, with reference to Embodiment A and Embodiment B, the embodiment about how to transmit multiple reference signals by using the REs originally occupied by the existing CSI-RS. In this embodiment, the reference signal corresponding to each subband group in the multiple subband groups may be transmitted by using the resource originally occupied by the CSI-RS; the CSI-RS may also be transmitted when the reference signal corresponding to each subband group in the multiple subband groups is transmitted. The following provides detailed descriptions with reference to Embodiment C and Embodiment D.

Embodiment C

The CSI-RS is transmitted to the user equipment by using second bearer REs in each subband in each subband group in the multiple subband groups, where the second bearer REs are REs originally occupied by the CSI-RS and are different from the first bearer REs for transmitting the reference signal corresponding to each subband group in the multiple subband groups; where the reference signal corresponding to each subband group in the multiple subband groups and the CSI-RS transmitted by using the second bearer REs are transmitted in a same antenna direction.

Figure 7A:
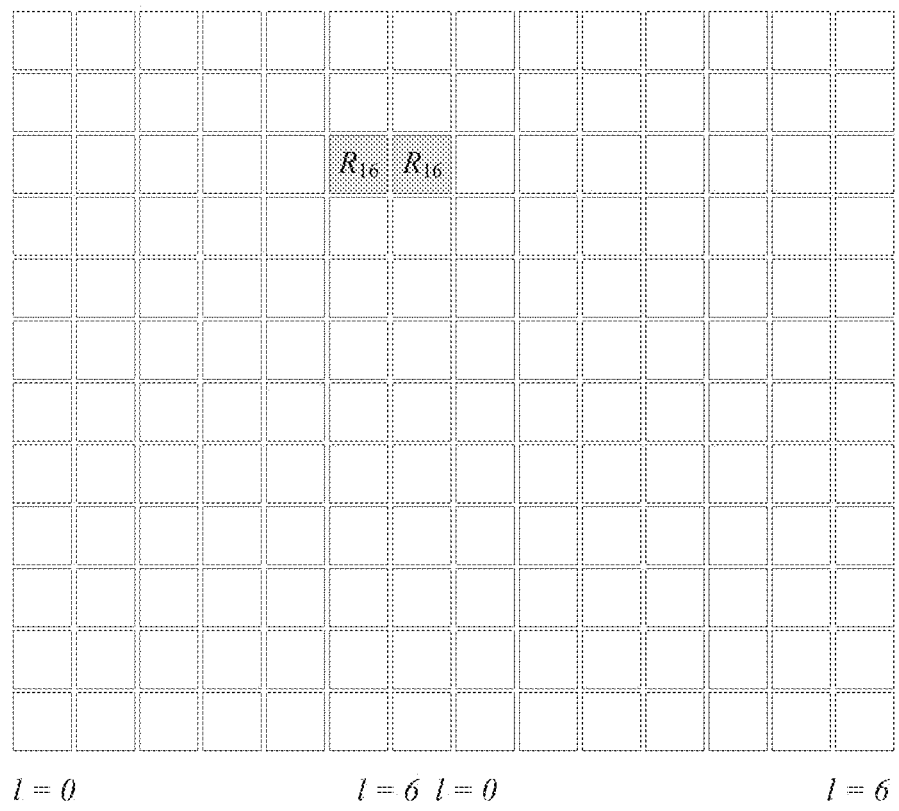
FIG. 7a is a diagram of a signal carried in a physical resource block in the prior art.
Figure 7B:
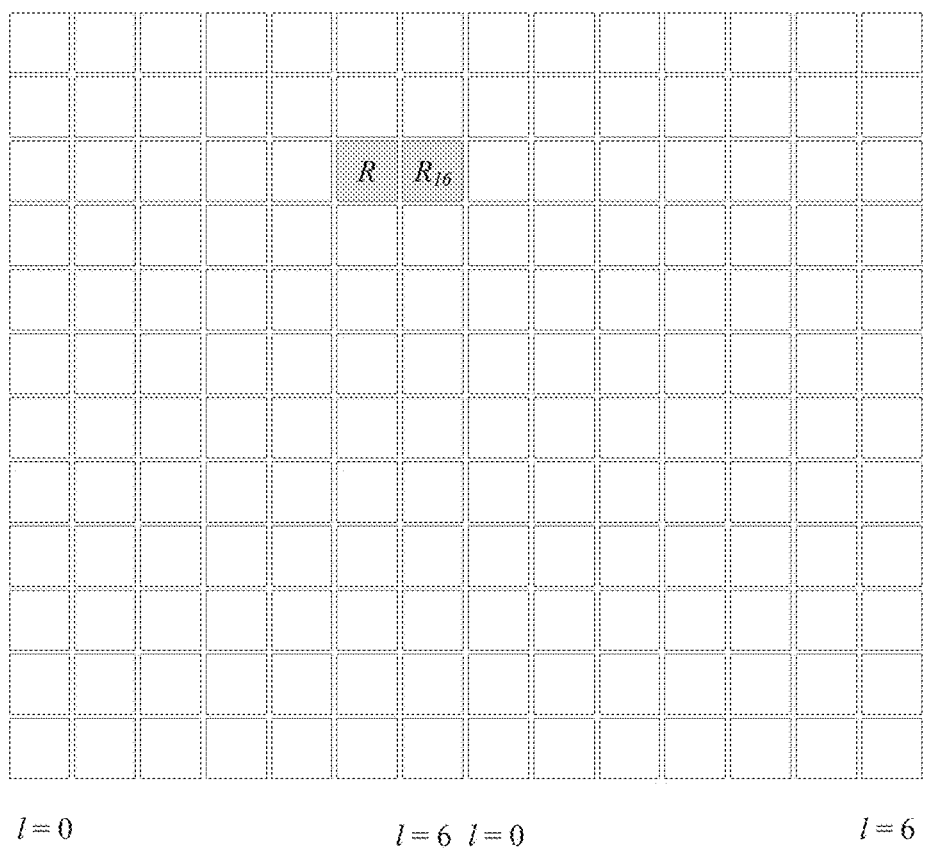
FIG. 7b is a diagram of a signal carried in a physical resource block according to an embodiment.

For example, as shown in FIG. 7a, in a physical resource block in a subframe with a normal CP, in the prior art, an RE corresponding to the sixth OFDM symbol ($l=5$) and the third subcarrier (an RE occupied by a CSI-RS with a port number 16) and an RE corresponding to the seventh OFDM symbol ($l=6$) and the third subcarrier (an RE occupied by a CSI-RS with a port number 16) may be used to transmit a reference signal corresponding to a CSI-RS port 16. Therefore, in this embodiment, the RE corresponding to the sixth OFDM symbol and the third subcarrier may be used to transmit a precoded reference signal, and the RE corresponding to the seventh OFDM symbol and the third subcarrier may be still used to transmit an original CSI-RS, for example, as shown in FIG. 7b.

The base station may transmit the precoded reference signal according to a manner of Embodiment A or according to a manner of Embodiment B, which is not further described herein for brevity. A specific behavior of the user equipment after the user equipment receives the reference signal corresponding to each subband group in the multiple subband groups and transmitted by the base station by using the first bearer REs and the CSI-RS transmitted by using the second bearer REs, is described in detail.

The user equipment may perform subtraction between a channel estimation value obtained by performing channel estimation on the reference signal corresponding to the first bearer REs in each subband group in the multiple subband groups and a channel estimation value obtained by performing channel estimation on the reference signal in the second bearer REs in each subband group, to obtain a channel estimation value difference corresponding to each subband group, where the channel estimation values are SINRs and the channel estimation value difference is an SINR difference, or the channel estimation values are CQIs and the channel estimation value difference is a CQI difference.

Specifically, the user equipment may perform channel estimation on the first bearer REs in each subband in each subband group to obtain an SINR or a CQI, perform channel estimation on the second bearer REs in each subband in each subband group to obtain an SINR or a CQI, perform subtraction between the two obtained CQIs to obtain a CQI difference corresponding to each subband, or perform subtraction between the two obtained SINRs to obtain an SINR difference corresponding to each subband, and perform averaging processing on SINR differences or CQI differences corresponding to all subbands in each subband group to obtain a CQI difference or an SINR difference corresponding to each subband group.

Then the user equipment may determine at least one subband group according to the channel estimation value difference corresponding to each subband group, and determine the channel state information, where a channel estimation value difference of the at least one subband group is greater than channel estimation value differences of other subband groups, and the channel state information includes a CQI difference corresponding to each subband group in the at least one subband group. Therefore, the user equipment may feed back, to the base station, the CQI difference corresponding to each subband group in the at least one subband group, and specifically may feed back a subband group index and a corresponding CQI difference.

Optionally, similar to Embodiment A and Embodiment B, in this embodiment, the user equipment may further feed back, to the base station, a CQI difference corresponding to each subband in the at least one subband group.

After receiving the CQI value corresponding to the at least one subband group and/or the CQI difference corresponding to each subband in the at least one subband group that are/is fed back by the user equipment, the base station determines the channel state of the user equipment, and therefore may further perform transmission scheduling of the downlink traffic channel according to the channel state of the user equipment.

In this embodiment, the reference signal corresponding to each subband group in the multiple subband groups and the CSI-RS transmitted in the second bearer REs may be transmitted in different subframes or may be transmitted in a same subframe. When they are transmitted in a same subframe, it may be ensured that the reference signal corresponding to each subband group in the multiple subband groups has a same time domain channel response feature as much as possible, so that channel information in the frequency domain is estimated more accurately. However, transmission in different subframes brings flexibility to resource allocation and scheduling to some extent, and is also an effective solution when the UE is located in a relatively static channel environment. Specifically, whether to perform transmission in a same subframe or in different subframes may be determined according to a specific condition.

In Embodiment C, the reference signal corresponding to each subband group in the multiple subband groups and the CSI-RS may be transmitted in different bearer REs in a same antenna direction. However, in this embodiment, the reference signal corresponding to each subband group in the multiple subband groups and the CSI-RS may be transmitted in different antenna directions, which is hereinafter described in detail with reference to Embodiment D.

Embodiment D

The original CSI-RS is transmitted by using third bearer REs, where the CSI-RS is transmitted in a first antenna direction, the reference signal corresponding to each subband group in the multiple subband groups is transmitted in a second antenna direction, the third bearer REs are resource elements originally occupied by the CSI-RS, and the third bearer REs are different from the first bearer REs.

This embodiment may be applied to co-polarized and cross-polarized antenna arrays. For describing this solution clearly, the following first provides diagrams of two co-polarized and cross-polarized 2D antenna arrays.

Figure 8A:
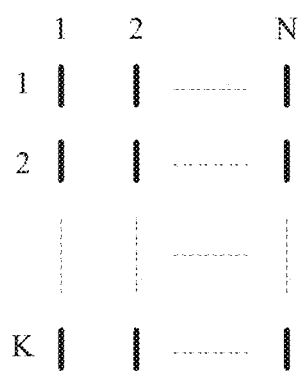
FIG. 8a and FIG. 8b are diagrams of two-dimensional antenna array elements in the prior art.
Figure 8B:
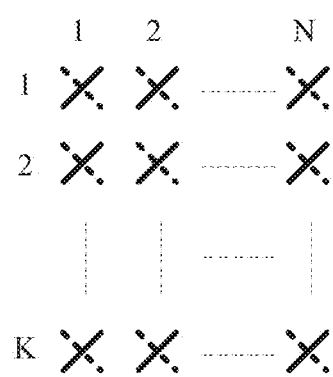

As shown in FIG. 8a, which is a co-polarized 2D antenna, the antenna has N array elements in a horizontal direction, and has K array elements in a vertical direction. A difference between FIG. 8a and FIG. 8b lies in that FIG. 8b is an antenna array with 45-degree cross-polarization, where N array elements in a horizontal direction refer to a quantity of co-polarized array elements. Even for a cross-polarization configuration, because loose coupling (for example, 15-20 dB isolation) may be made between two mutually crossed antennas, when cross-polarized antennas are actually considered, two groups of co-polarized antennas may be considered. Just for this reason, co-polarized antenna array elements shown in FIG. 8a are used as an example for description.

In the prior art, an antenna configuration on a base station side may be considered as a row in FIG. 8a, with N ports in total. For example, antenna configurations that may be supported in LTE to Release Rel-11 are 1, 2, 4, and 8 respectively. A maximum quantity is eight antennas, arranged in a horizontal direction. An advantage of this is that a spatial resolution of maximum eight antennas may be achieved in the horizontal direction. However, an antenna arrangement in a vertical direction is added for a currently researched 2D antenna, and an antenna structure of a linear array changes to an antenna structure of a planar shape. That is, a quantity of antenna ports changes from N in the prior art to N*K. For example, 4*4=16, 4*8=32, and 8*8=64, that is, a quantity of antennas that need to be supported increases by several times in contrast to the original maximum eight antenna ports.

The following describes how to extend the quantity of antenna ports in this antenna structure. First, in a direction, for example, in the horizontal direction, N CSI-RS antenna ports are configured. When N is not greater than 8, configurations of the existing eight CSI-RS antenna ports may be directly used; when N is greater than 8, new antenna ports may be added on a basis of the configuration manner of the existing eight CSI-RS antenna ports. The N CSI-RS ports in the horizontal direction respectively use different time-frequency resources. Then all K ports in the vertical direction corresponding to each CSI-RS port in the horizontal direction are generated in a manner of mapping different subband groups to different antenna port numbers according to CSI-RS full bandwidth signals. For details about how to perform subband group division and reference signal generation, reference may be made to the description of the foregoing embodiments, and no further description is provided herein.

After the user equipment receives the reference signal corresponding to each subband group in the multiple subband groups and transmitted by the base station and the CSI-RS transmitted by using the third bearer REs, the user equipment may obtain, according to the reference signal corresponding to each subband group in the multiple subband groups, a CQI in the first direction and corresponding to each subband group in at least one subband group, and further, may obtain a CQI in the first direction and corresponding to each subband in each subband group in the at least one subband group; and obtain at least one of a precoding matrix indicator (PMI), a rank indicator (RI), and a CQI in the second direction, and feed back the obtained channel state information to the base station.

Therefore, after receiving the channel state information fed back by the user equipment, the base station determines the channel state of the user equipment, and therefore may perform transmission scheduling of the downlink traffic channel according to the channel state of the user equipment.

It should be understood that, the foregoing Embodiments A, B, C, and D are only specific embodiments, and should not constitute any limitation to the scope. This embodiment may further have other variants, for example, Embodiment C and Embodiment D may be combined, that is, when the reference signal corresponding to each subband group in the multiple subband groups is transmitted by using the first bearer REs, the CSI-RS is transmitted in the second bearer REs in an antenna direction same as an antenna direction for transmitting the reference signal corresponding to each subband group in the multiple subband groups, and the CSI-RS is transmitted in the third bearer REs in an antenna direction different from the antenna direction for transmitting the reference signal corresponding to each subband group in the multiple subband groups. In this transmission manner, the behavior of the user equipment may be obtained with reference to the behaviors of the user equipment in Embodiment C and Embodiment D.

Therefore, in the embodiments, on a basis of REs originally occupied by a CSI-RS, multiple subband groups are obtained by dividing physical resource blocks corresponding to the REs occupied by the CSI-RS; a reference signal corresponding to each subband group is obtained by performing a precoding operation on a CSI-RS originally carried in first bearer REs in each subband in each subband group, and different precoding is used when precoding operations are performed on the CSI-RS originally carried in the first bearer REs in different subband groups; and the reference signal corresponding to each subband group in the multiple subband groups is transmitted by using the first bearer REs in each subband group. Because different precoding is used when precoding operations are performed on the CSI-RS originally carried in the first bearer REs in different subband groups, reference signals corresponding to different subband groups may correspond to different antenna ports. Therefore, without increasing resource consumption, a quantity of antenna ports can be increased, and more transmit antennas can be supported. In addition, because new resources are not used, backward compatibility with legacy UE can be achieved.

FIG. 9 is a schematic flowchart of an information transmission method 200 according to an embodiment. As shown in FIG. 9, the method 200 includes:

S210. Receive, in first bearer resource elements (REs) in each subband group in multiple subband groups, a reference signal transmitted by a base station and corresponding to each subband group, where the multiple subband groups are obtained by dividing multiple physical resource blocks corresponding to REs originally occupied by a CSI-RS, the reference signal corresponding to each subband group in the multiple subband groups is generated by performing a precoding operation on the CSI-RS originally carried in the first bearer REs in each subband in each subband group, and different precoding is used when precoding operations are performed on the CSI-RS originally carried in the first bearer REs in different subband groups.

S220. Obtain channel state information through estimation according to the reference signal corresponding to each subband group in the multiple subband groups.

S230. Transmit feedback information to the base station, where the feedback information includes the channel state information.

Therefore, in this embodiment, on a basis of REs originally occupied by a CSI-RS, multiple subband groups are obtained by dividing physical resource blocks corresponding to the REs occupied by the CSI-RS; a reference signal corresponding to each subband group is obtained by performing a precoding operation on a CSI-RS originally carried in first bearer REs in each subband in each subband group, and different precoding is used when precoding operations are performed on the CSI-RS originally carried in the first bearer REs in different subband groups; the reference signal corresponding to each subband group in the multiple subband groups is transmitted by using the first bearer REs in each subband group; and user equipment obtains channel state information through channel estimation according to the signal corresponding to each subband group, and feeds back the channel state information to a base station. Because different precoding is used when precoding operations are performed on the CSI-RS originally carried in the first bearer REs in different subband groups, reference signals corresponding to different subband groups may correspond to different antenna ports. Therefore, without increasing resource consumption, a quantity of antenna ports can be increased, and more transmit antennas can be supported. In addition, because new resources are not used, backward compatibility with legacy user equipment UE can be achieved.

Optionally, in this embodiment, the CSI-RS is a CSI-RS defined in Rel-10 of an LTE protocol.

The following describes the information processing method according to the embodiment with reference to several embodiments from a user equipment side.

Embodiment A

In this embodiment, each subband group in the multiple subband groups includes multiple subbands, and each subband includes one physical resource block or multiple continuous physical resource blocks in a frequency domain, where the multiple subbands included in each subband group are discrete in the frequency domain. For a specific division manner, reference may be made to the description about FIG. 5 on a base station side. The following describes in detail a specific behavior of the user equipment in the resource division manner.

Specifically, the user equipment may perform channel estimation on each physical resource block in each subband group to obtain an SINR corresponding to each frequency domain physical resource block in each subband group; perform averaging processing on SINRs corresponding to all physical resource blocks in each subband group to obtain an SINR corresponding to each subband group; determine, according to the SINR corresponding to each subband group, at least one subband group from the multiple subband groups, where an SINR corresponding to each subband group in the at least one subband group is greater than an SINR corresponding to other subband groups than the at least one subband group; obtain, according to the SINR corresponding to the at least one subband group, a channel quality indicator (CQI) corresponding to the at least one subband group; and feed back, to the base station, the CQI corresponding to the at least one subband group. Specifically, the user equipment may feed back a subband group index value of the at least one subband group and a corresponding CQI value.

Preferably, the user equipment may determine one subband group from the multiple subband groups, where an SINR corresponding to the one subband group is greater than an SINR corresponding to any other subband group; obtain, according to the SINR corresponding to the one subband group, a CQI corresponding to the one subband group; and feed back, to the base station, the CQI corresponding to the one subband group. Specifically, the user equipment may feed back a subband group index value of the one subband group and a corresponding CQI value.

Optionally, the user equipment may further obtain, according to an SINR value corresponding to a physical resource block of each subband in each subband group in the at least one subband group, an SINR value corresponding to each subband in each subband group in the at least one subband group; obtain, according to the SINR value corresponding to each subband in each subband group in the at least one subband group, a CQI corresponding to each subband in each subband group in the at least one subband group; and feed back, to the base station, the CQI corresponding to each subband in each subband group in the at least one subband group. Specifically, the user equipment may feed back an index value of each subband in the at least one subband group and a corresponding CQI value.

After receiving the CQI value corresponding to the at least one subband group and fed back by the user equipment, the base station may determine a spatial position in a corresponding direction of a uniform linear array in which the user equipment is located, and determine signal strength in the position. Therefore, the base station may perform transmission scheduling of a downlink traffic channel according to information of the spatial position of the user equipment (namely, the specific spatial position and strength).

If the user equipment further feeds back, to the base station, the CQI of each subband in each subband group in the at least one subband group, the base station may perform scheduling for the user equipment with reference to both the CQI value corresponding to the at least one subband group and the CQI corresponding to each subband in the at least subband group. In this way, a channel state can be better used, and system performance can be improved. This is because the subbands included in each subband group are discrete in the frequency domain, but the CQI corresponding to the at least one subband group and determined by the user equipment is obtained from an average SINR of physical resource blocks included in the discrete subbands, and therefore can reflect a channel state of the entire system bandwidth; however, the user equipment feeds back, to the base station, the CQI corresponding to the subband included in each subband group in the at least one subband group, and the CQI can reflect a channel state corresponding to the subband because the CQI corresponding to the subband is obtained through channel estimation according to the reference signal carried in the subband.

Embodiment B

In this embodiment, each subband group in the multiple subband groups includes multiple subbands, and each subband includes one physical resource block or multiple continuous physical resource blocks in a frequency domain, where the multiple subbands included in each subband group are continuous in the frequency domain. For a specific division manner, reference may be made to the description about FIG. 6 on a base station side.

The user equipment may perform channel estimation on each physical resource block in each subband group to obtain an SINR corresponding to each physical resource block in each subband group; perform averaging processing on SINRs corresponding to all physical resource blocks in each subband group to obtain an SINR corresponding to each subband group; determine, according to the SINR corresponding to each subband group, at least one subband group from the multiple subband groups, where an SINR corresponding to each subband group in the at least one subband group is greater than an SINR corresponding to other subband groups than the at least one subband group; obtain, according to the SINR corresponding to the at least one subband group, a CQI corresponding to the at least one subband group; and feed back, to the base station, the CQI corresponding to the at least one subband group. Specifically, the user equipment may feed back a subband group index value of the at least one subband group and a corresponding CQI value.

Preferably, the user equipment may determine one subband group from the multiple subband groups, where an SINR corresponding to the one subband group is greater than an SINR corresponding to any other subband group; obtain, according to the SINR corresponding to the one subband group, a CQI corresponding to the one subband group; and feed back, to the base station, the CQI corresponding to the one subband group. Specifically, the user equipment may feed back a subband group index value of the one subband group and a corresponding CQI value.

Optionally, the user equipment may further obtain, according to an SINR value corresponding to a physical resource block of each subband in each subband group in the at least one subband group, an SINR value corresponding to each subband in each subband group in the at least one subband group; obtain, according to the SINR value corresponding to each subband in each subband group in the at least one subband group, a CQI corresponding to each subband in each subband group in the at least one subband group; and feed back, to the base station, the CQI corresponding to each subband in each subband group in the at least one subband group. Specifically, the user equipment may feed back an index value of each subband in the at least one subband group and a corresponding CQI value.

After receiving the CQI value corresponding to the at least one subband group and fed back by the user equipment, the base station may determine a spatial position in a corresponding direction of a uniform linear array in which the user equipment is located, and determine signal strength in the position. Therefore, the base station may perform transmission scheduling of a downlink traffic channel according to information of the spatial position of the user equipment (namely, the specific spatial position and strength).

If the user equipment further feeds back, to the base station, the CQI of each subband in each subband group in the at least one subband group, the base station may perform scheduling for the user equipment with reference to both the CQI value corresponding to the at least one subband group and the CQI corresponding to each subband in the at least subband group. In this way, a channel state can be better used, and system performance can be improved. This is because a frequency domain range of the subband group is large, and a CQI obtained from an average SINR of physical resource blocks included in the subband group may reflect channel states in a large frequency domain range; however, the user equipment feeds back, to the base station, the CQI corresponding to the subband included in each subband group in the at least one subband group, and the CQI can reflect channel states in a relatively small frequency domain range because a frequency domain range of the subband is relatively small and the CQI is obtained through channel estimation according to the reference signal carried in the subband.

Embodiment C

In this embodiment, the method 200 may further include: receiving the CSI-RS transmitted by the base station by using second bearer REs in each subband in each subband group, where the second bearer REs are REs originally occupied by the CSI-RS and are different from the first bearer REs, where the reference signal corresponding to each subband group in the multiple subband groups and the CSI-RS transmitted by using the second bearer REs are transmitted in a same antenna direction; and correspondingly, the obtaining channel state information through estimation according to the reference signal corresponding to each subband group in the multiple subband groups in step S220 may include: obtaining the channel state information through estimation according to the reference signal corresponding to each subband group in the multiple subband groups and the CSI-RS received in the second bearer REs.

Specifically, the user equipment may perform subtraction between a channel estimation value obtained by performing channel estimation on the reference signal carried in the first bearer REs in each subband in each subband group in the multiple subband groups and a channel estimation value obtained by performing channel estimation on the reference signal carried in the second bearer REs in each subband group, to obtain a channel estimation value difference corresponding to each subband group, where the channel estimation values are SINRs and the channel estimation value difference is an SINR difference, or the channel estimation values are CQIs and the channel estimation value difference is a CQI difference; and determine at least one subband group according to the channel estimation value difference corresponding to each subband group, and determine the channel state information, where a channel estimation value difference of the at least one subband group is greater than channel estimation value differences of other subband groups, and the channel state information includes a CQI difference corresponding to each subband group in the at least one subband group.

Further, the channel state information includes a CQI difference corresponding to each subband in each subband group in the at least one subband group, where the CQI corresponding to each subband in each subband group in the at least one subband group is obtained by performing subtraction between a channel estimation value obtained by performing channel estimation according to the first bearer REs in each subband and a channel estimation value obtained by performing channel estimation according to the second bearer REs.

In this embodiment, the reference signal corresponding to each subband group in the multiple subband groups and the CSI-RS transmitted in the second bearer REs may be transmitted in different subframes or may be transmitted in a same subframe. When they are transmitted in a same subframe, it may be ensured that the reference signal corresponding to each subband group in the multiple subband groups has a same time domain channel response feature as much as possible, so that channel information in the frequency domain is estimated more accurately. However, transmission in different subframes brings flexibility to resource allocation and scheduling to some extent, and is also an effective solution when the UE is located in a relatively static channel environment. Specifically, whether to perform transmission in a same subframe or in different subframes may be determined according to a specific condition.

Embodiment D

In this embodiment, the method 200 may further include: receiving, in third bearer REs, the CSI-RS transmitted by the base station, where the reference signal corresponding to each subband group in the multiple subband groups is transmitted in a first antenna direction by the base station, the CSI-RS is transmitted in a second antenna direction by the base station by using the third bearer REs, and the third bearer REs are REs originally occupied by the CSI-RS and are different from the first bearer REs; and the obtaining channel state information through estimation according to the reference signal corresponding to each subband group in the multiple subband groups includes: obtaining the channel state information through estimation according to the reference signal corresponding to each subband group in the multiple subband groups and the CSI-RS received in the second bearer REs.

Specifically, the user equipment may obtain, according to the reference signal corresponding to each subband group in the multiple subband groups, a CQI in the first direction and corresponding to each subband group in at least one subband group; and obtain, according to the CSI-RS, at least one of a PMI, an RI, and a CQI in the second direction.

It should be understood that, for corresponding operations of the user equipment in the method 200, reference may be made to the description in the method 100. For brevity, no further description is provided herein.

Therefore, in the embodiments, on a basis of REs originally occupied by a CSI-RS, multiple subband groups are obtained by dividing physical resource blocks corresponding to the REs occupied by the CSI-RS; a reference signal corresponding to each subband group is obtained by performing a precoding operation on a CSI-RS originally carried in first bearer REs in each subband in each subband group, and different precoding is used when precoding operations are performed on the CSI-RS originally carried in the first bearer REs in different subband groups; the reference signal corresponding to each subband group in the multiple subband groups is transmitted by using the first bearer REs in each subband group; and user equipment obtains channel state information through channel estimation according to the signal corresponding to each subband group, and feeds back the channel state information to a base station. Because different precoding is used when precoding operations are performed on the CSI-RS originally carried in the first bearer REs in different subband groups, reference signals corresponding to different subband groups may correspond to different antenna ports. Therefore, without increasing resource consumption, a quantity of antenna ports can be increased, and more transmit antennas can be supported. In addition, because new resources are not used, backward compatibility with legacy user equipment UE can be achieved.

The foregoing has described the information processing methods according to the embodiments with reference to FIG. 1 to FIG. 9. The following describes in detail a base station and user equipment for implementing the foregoing methods.

Figure 10:
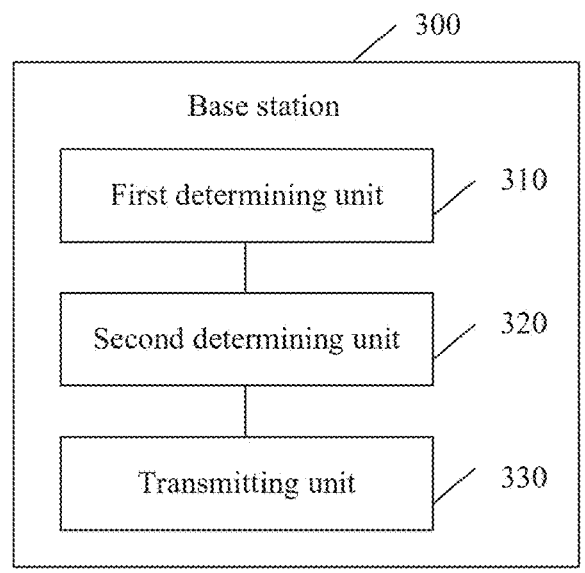
FIG. 10 is a schematic block diagram of a base station according to an embodiment.

FIG. 10 is a schematic block diagram of a base station 300 according to an embodiment. As shown in FIG. 10, the base station 300 includes: a first determining unit 310, configured to determine multiple subband groups, where the multiple subband groups are obtained by dividing multiple physical resource blocks corresponding to REs originally occupied by a CSI-RS, and each subband group in the multiple subband groups includes at least one subband; a second determining unit 320, configured to determine a reference signal corresponding to each subband group in the multiple subband groups, where the reference signal corresponding to each subband group is generated by performing a precoding operation on the CSI-RS originally carried in first bearer REs in each subband in each subband group, and different precoding is used when precoding operations are performed on the CSI-RS originally carried in the first bearer REs in different subband groups; and a transmitting unit 330, configured to transmit, by using the first bearer REs in each subband group in the multiple subband groups, the reference signal corresponding to each subband group.

Specifically, the first determining unit 310 may obtain multiple subband groups by dividing multiple physical resource blocks (all or some physical resource blocks) corresponding to REs occupied by CSI-RS corresponding to a certain antenna port, where each subband group may include at least one subband, and each subband may include at least one physical resource block; the second determining unit 320 may determine a reference signal corresponding to each subband group in the multiple subband groups, where the reference signal corresponding to each subband group may be obtained by performing a precoding operation on a CSI-RS originally carried in first bearer REs in each subband in each subband group, and different precoding is used (that is, different precoding vectors or matrices are used) when precoding operations are performed on the CSI-RS originally carried in the first bearer REs in different subband groups; after the second determining unit 320 determines the reference signal corresponding to each subband group in the multiple subband groups, the transmitting unit 330 may transmit the reference signal corresponding to each subband group in the multiple subband groups, and specifically, may transmit, by using the first bearer REs in each subband group in the multiple subband groups, the reference signal corresponding to each subband group. The CSI-RS is a CSI-RS carried in the REs in the prior art.

It should be understood that, in this embodiment, the reference signal corresponding to each subband group in the multiple subband groups may be preconfigured in the second determining unit 320, where the preconfigured reference signal corresponding to each subband group in the multiple subband groups may also be generated based on the following principle: The reference signal corresponding to each subband group is obtained by performing a precoding operation on the CSI-RS originally carried in the first bearer REs in each subband in each subband group, and different precoding is used when precoding operations are performed on the CSI-RS originally carried in the first bearer REs in different subband groups.

It should also be understood that, in this embodiment, each subband included in the multiple subband groups may also be preconfigured, where the subbands included in the multiple subband groups are also preconfigured based on the following principle: The multiple subband groups are obtained by dividing multiple physical resource blocks corresponding to the REs originally occupied by the CSI-RS, each subband group in the multiple subband groups includes at least one subband, and each subband includes at least one physical resource block.

Therefore, in this embodiment, on a basis of REs originally occupied by a CSI-RS, multiple subband groups are obtained by dividing physical resource blocks corresponding to the REs occupied by the CSI-RS; a reference signal corresponding to each subband group is obtained by performing a precoding operation on a CSI-RS originally carried in first bearer REs in each subband in each subband group, and different precoding is used when precoding operations are performed on the CSI-RS originally carried in the first bearer REs in different subband groups; and the reference signal corresponding to each subband group in the multiple subband groups is transmitted by using the first bearer REs in each subband group. Because different precoding is used when precoding operations are performed on the CSI-RS originally carried in the first bearer REs in different subband groups, reference signals corresponding to different subband groups may correspond to different antenna ports. Therefore, without increasing resource consumption, a quantity of antenna ports can be increased, and more transmit antennas can be supported. In addition, because new resources are not used, backward compatibility with legacy UE can be achieved.

Optionally, the CSI-RS in this embodiment may be a CSI-RS defined in Release Rel-10 of an LTE protocol.

In this embodiment, a physical resource block corresponding to REs originally occupied by a CSI-RS means that, as long as a base station transmits the CSI-RS in some REs in a certain physical resource block in the prior art, it may be considered that the physical resource block is a physical resource block corresponding to the REs originally occupied by the CSI-RS.

Optionally, in this embodiment, that different precoding is used when precoding operations are performed on the CSI-RS originally carried in the first bearer REs in different subband groups may be that precoding pointing to different spatial directions is used, where the precoding may be a precoding vector or may be a precoding matrix or the like.

Figure 11:
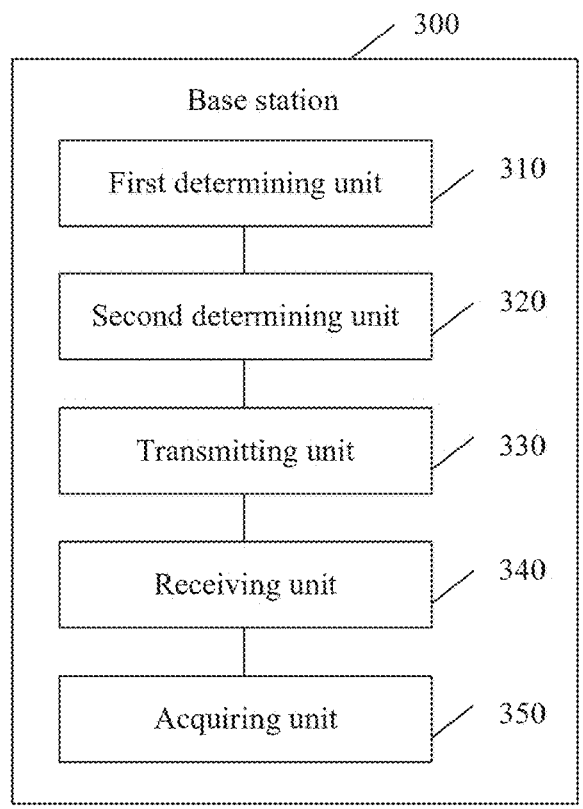
FIG. 11 is a schematic block diagram of a base station according to an embodiment.

Optionally, in this embodiment, as shown in FIG. 11, the base station 300 may further include: a receiving unit 340, configured to receive feedback information transmitted by user equipment, where the feedback information includes channel state information obtained by the user equipment through estimation according to the reference signal corresponding to each subband group in the multiple subband groups; and an acquiring unit 350, configured to acquire a channel state of the user equipment according to the feedback information.

Specifically, after the user equipment receives the reference signal corresponding to each subband group in the multiple subband groups and transmitted by the base station, the user equipment may obtain the channel state information by performing channel estimation according to the reference signal corresponding to each subband group in the multiple subband groups and transmitted by the base station, and then transmit, to the base station by using the feedback information, the channel state information obtained through channel estimation according to the reference signal corresponding to each subband group in the multiple subband groups; the receiving unit 340 of the base station receives the feedback information, and the acquiring unit 350 may acquire the channel state of the user equipment according to the feedback information, so that the base station 300 may further perform transmission scheduling of a downlink traffic channel according to the channel state of the user equipment.

For understanding the embodiments more clearly, the following describes in detail the base station in the embodiments with reference to several specific embodiments.

Embodiment A

Each subband group in the multiple subband groups includes multiple subbands, and each subband includes one physical resource block or multiple continuous physical resource blocks in a frequency domain, where the multiple subbands included in each subband group are discrete in the frequency domain. For a specific division method, reference may be made to the description about FIG. 5 in the method 100.

Figure 12:
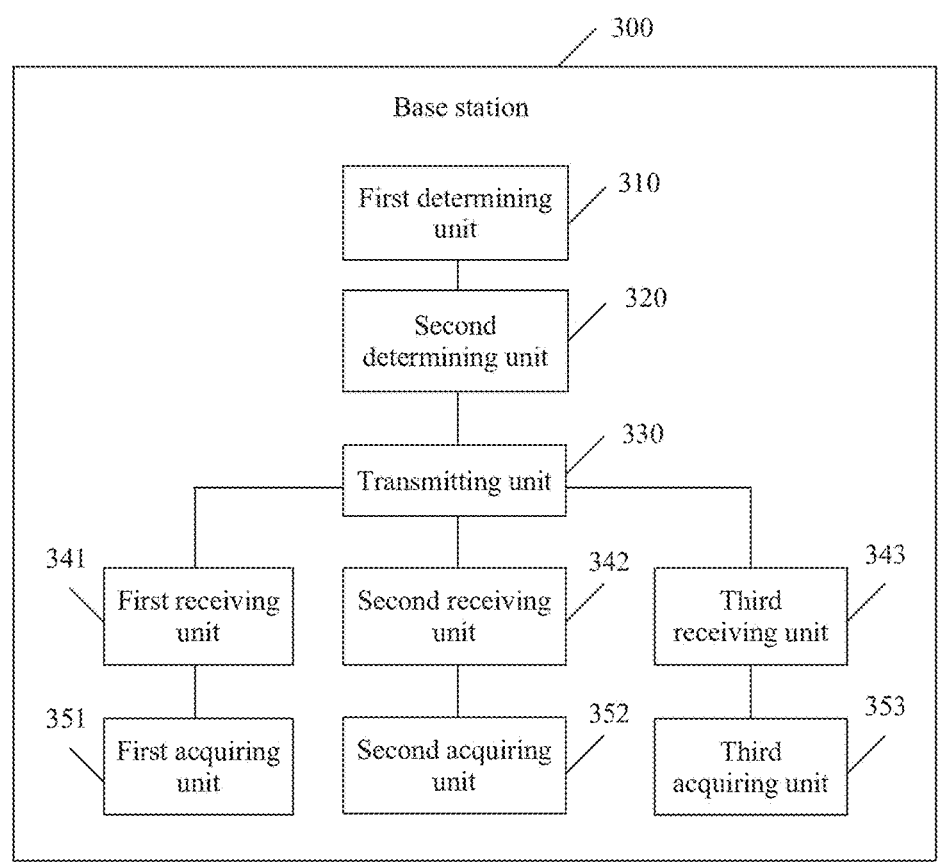
FIG. 12 is a schematic block diagram of a base station according to an embodiment.

Optionally, in this embodiment, as shown in FIG. 12, the base station 300 includes: a first receiving unit 341, configured to receive feedback information transmitted by the user equipment, where the feedback information is channel state information obtained by the user equipment according to the reference signal corresponding to each subband group in the multiple subband groups, where the channel state information includes channel state information corresponding to at least one subband group and/or channel state information corresponding to each subband in the at least one subband group; and a first acquiring unit 351, configured to acquire the channel state of the user equipment according to the feedback information.

Specifically, the user equipment may perform channel estimation on each physical resource block in each subband group to obtain an SINR corresponding to each frequency domain physical resource block in each subband group; perform averaging processing on SINRs corresponding to all physical resource blocks in each subband group to obtain an SINR corresponding to each subband group; determine, according to the SINR corresponding to each subband group, the at least one subband group from the multiple subband groups, where an SINR corresponding to each subband group in the at least one subband group is greater than an SINR corresponding to other subband groups than the at least one subband group; obtain, according to the SINR corresponding to the at least one subband group, a channel quality indicator (CQI) corresponding to the at least one subband group; and feed back, to the base station, the CQI corresponding to the at least one subband group.

Specifically, the user equipment may feed back a subband group index value of the at least one subband group and a corresponding CQI value.

Preferably, the user equipment may determine one subband group from the multiple subband groups, where an SINR corresponding to the one subband group is greater than an SINR corresponding to any other subband group; obtain, according to the SINR corresponding to the one subband group, a CQI corresponding to the one subband group; and feed back, to the base station, the CQI corresponding to the subband group. Specifically, the user equipment may feed back a subband group index value of the one subband group and a corresponding CQI value.

Optionally, the user equipment may further obtain, according to an SINR value corresponding to a physical resource block of each subband in each subband group in the at least one subband group, an SINR value corresponding to each subband in each subband group in the at least one subband group; obtain, according to the SINR value corresponding to each subband in each subband group in the at least one subband group, a CQI corresponding to each subband in each subband group in the at least one subband group; and feed back, to the base station, the CQI corresponding to each subband in each subband group in the at least one subband group. Specifically, the user equipment may feed back an index value of each subband in the at least one subband group and a corresponding CQI value.

After the first receiving unit 341 receives the CQI value corresponding to the at least one subband group and fed back by the user equipment, the first acquiring unit 351 may determine a spatial position in a corresponding direction of a uniform linear array in which the user equipment is located, and determine signal strength in the position. Therefore, the base station may perform transmission scheduling of the downlink traffic channel according to information of the spatial position of the user equipment (namely, the specific spatial position and strength).

If the user equipment further feeds back, to the base station, the CQI of each subband in each subband group in the at least one subband group, the first acquiring unit 351 may acquire the CQI value corresponding to the at least one subband group and the CQI corresponding to each subband in the at least subband group, so that the base station may perform scheduling for the user equipment with reference to both the CQI value corresponding to the at least one subband group and the CQI corresponding to each subband in the at least subband group. In this way, the channel state can be better used, and system performance can be improved. This is because the subbands included in each subband group are discrete in the frequency domain, but the CQI corresponding to the at least one subband group and determined by the user equipment is obtained from an average SINR of physical resource blocks included in the discrete subbands, and therefore can reflect a channel state of the entire system bandwidth; however, the user equipment feeds back, to the base station, the CQI corresponding to the subband included in each subband group in the at least one subband group, and the CQI can reflect a channel state corresponding to the subband because the CQI corresponding to the subband is obtained through channel estimation according to the reference signal carried in the subband.

Embodiment B

Optionally, in this embodiment of the embodiments, each subband group in the multiple subband groups includes multiple subbands, and each subband includes one physical resource block or multiple continuous physical resource blocks in a frequency domain, where the multiple subbands included in each subband group are continuous in the frequency domain. For a specific division method, reference may be made to the description about FIG. 6 in the method 100.

Optionally, in this embodiment, as shown in FIG. 12, the base station 300 includes: a first receiving unit 341, configured to receive feedback information transmitted by the user equipment, where the feedback information is channel state information obtained by the user equipment according to the reference signal corresponding to each subband group in the multiple subband groups, where the channel state information includes channel state information corresponding to at least one subband group and/or channel state information corresponding to each subband in the at least one subband group; and a first acquiring unit 351, configured to acquire the channel state of the user equipment according to the feedback information.

Specifically, the user equipment may perform channel estimation on each physical resource block in each subband group to obtain an SINR corresponding to each frequency domain physical resource block in each subband group; perform averaging processing on SINRs corresponding to all physical resource blocks in each subband group to obtain an SINR corresponding to each subband group; determine, according to the SINR corresponding to each subband group, the at least one subband group from the multiple subband groups, where an SINR corresponding to each subband group in the at least one subband group is greater than an SINR corresponding to other subband groups than the at least one subband group; obtain, according to the SINR corresponding to the at least one subband group, a channel quality indicator (CQI) corresponding to the at least one subband group; and feed back, to the base station, the CQI corresponding to the at least one subband group. Specifically, the user equipment may feed back a subband group index value of the at least one subband group and a corresponding CQI value.

Preferably, the user equipment may determine one subband group from the multiple subband groups, where an SINR corresponding to the one subband group is greater than an SINR corresponding to any other subband group; obtain, according to the SINR corresponding to the one subband group, a CQI corresponding to the one subband group; and feed back, to the base station, the CQI corresponding to the at least one subband group. Specifically, the user equipment may feed back a subband group index value of the one subband group and a corresponding CQI value.

Optionally, the user equipment may further obtain, according to an SINR value corresponding to a physical resource block of each subband in each subband group in the at least one subband group, an SINR value corresponding to each subband in each subband group in the at least one subband group; obtain, according to the SINR value corresponding to each subband in each subband group in the at least one subband group, a CQI corresponding to each subband in each subband group in the at least one subband group; and feed back, to the base station, the CQI corresponding to each subband in each subband group in the at least one subband group. Specifically, the user equipment may feed back an index value of each subband in the at least one subband group and a corresponding CQI value.

After the first receiving unit 341 receives the CQI value corresponding to the at least one subband group and fed back by the user equipment, the first acquiring unit 351 may determine a spatial position in a corresponding direction of a uniform linear array in which the user equipment is located, and determine signal strength in the position. Therefore, the base station may perform transmission scheduling of the downlink traffic channel according to information of the spatial position of the user equipment (namely, the specific spatial position and strength).

If the user equipment further feeds back, to the base station, the CQI of each subband in each subband group in the at least one subband group, the first acquiring unit 351 may acquire the CQI value corresponding to the at least one subband group and the CQI corresponding to each subband in the at least subband group, so that the base station may perform scheduling for the user equipment with reference to both the CQI value corresponding to the at least one subband group and the CQI corresponding to each subband in the at least subband group. In this way, the channel state can be better used, and system performance can be improved. This is because a frequency domain range of the subband group is large, and a CQI obtained from an average SINR of physical resource blocks included in the subband group may reflect channel states in a large frequency domain range; however, the user equipment feeds back, to the base station, the CQI corresponding to the subband included in each subband group in the at least one subband group, and the CQI can reflect channel states in a relatively small frequency domain range because a frequency domain range of the subband is relatively small and the CQI is obtained through channel estimation according to the reference signal carried in the subband.

Embodiment C

In this embodiment, the transmitting unit 330 is further configured to: transmit the CSI-RS to the user equipment by using second bearer REs in each subband in each subband group, where the second bearer REs are REs originally occupied by the CSI-RS and are different from the first bearer REs; where the reference signal corresponding to each subband group in the multiple subband groups and the CSI-RS transmitted by using the second bearer REs are transmitted in a same antenna direction.

Optionally, as shown in FIG. 12, the base station 300 further includes: a second receiving unit 342, configured to receive feedback information transmitted by the user equipment, where the feedback information includes channel state information obtained by the user equipment through estimation according to the reference signal corresponding to each subband group in the multiple subband groups and the CSI-RS transmitted in the second bearer REs, where the channel state information includes a CQI difference corresponding to each subband group and/or a CQI difference corresponding to each subband in each subband group; and a second acquiring unit 352, configured to acquire the channel state of the user equipment according to the feedback information.

The base station may transmit the reference signal corresponding to each subband group in the multiple subband groups according to a manner of Embodiment A or according to a manner of Embodiment B, which is not further described herein for brevity.

The user equipment may perform subtraction between a channel estimation value obtained by performing channel estimation on the reference signal corresponding to the first bearer REs in each subband group in the multiple subband groups and a channel estimation value obtained by performing channel estimation on the reference signal in the second bearer REs in each subband group, to obtain a channel estimation value difference corresponding to each subband group, where the channel estimation values are SINRs and the channel estimation value difference is an SINR difference, or the channel estimation values are CQIs and the channel estimation value difference is a CQI difference.

Specifically, the user equipment may perform channel estimation on the first bearer REs in each subband in each subband group to obtain an SINR or a CQI, perform channel estimation on the second bearer REs in each subband in each subband group to obtain an SINR or a CQI, perform subtraction between the two obtained CQIs to obtain a CQI difference corresponding to each subband, or perform subtraction between the two obtained SINRs to obtain an SINR difference corresponding to each subband, and perform averaging processing on SINR differences or CQI differences corresponding to all subbands in each subband group to obtain a CQI difference or an SINR difference corresponding to each subband group.

Then the user equipment may determine at least one subband group according to the channel estimation value difference corresponding to each subband group, and determine the channel state information, where a channel estimation value difference of the at least one subband group is greater than channel estimation value differences of other subband groups, and the channel state information includes a CQI difference corresponding to each subband group in the at least one subband group. Therefore, the user equipment may feed back, to the base station, the CQI difference corresponding to each subband group in the at least one subband group, and specifically may feed back a subband group index and a corresponding CQI difference.

Optionally, similar to Embodiment A and Embodiment B, in this embodiment, the user equipment may further feed back, to the base station, a CQI difference corresponding to each subband in the at least one subband group.

After the second receiving unit 342 of the base station receives the CQI value corresponding to the at least one subband group and/or the CQI difference corresponding to each subband in the at least one subband group that are/is fed back by the user equipment, the second acquiring unit 352 determines the channel state of the user equipment, and therefore the base station may further perform transmission scheduling of the downlink traffic channel according to the channel state of the user equipment.

In this embodiment, the reference signal corresponding to each subband group in the multiple subband groups and the CSI-RS transmitted in the second bearer REs may be transmitted in different subframes or may be transmitted in a same subframe. When they are transmitted in a same subframe, it may be ensured that the reference signal corresponding to each subband group in the multiple subband groups has a same time domain channel response feature as much as possible, so that channel information in the frequency domain is estimated more accurately. However, transmission in different subframes brings flexibility to resource allocation and scheduling to some extent, and is also an effective solution when the UE is located in a relatively static channel environment. Specifically, whether to perform transmission in a same subframe or in different subframes may be determined according to a specific condition.

Embodiment D

In this embodiment, the transmitting unit 330 is further configured to: transmit the CSI-RS by using third bearer REs; where the reference signal corresponding to each subband group in the multiple subband groups is transmitted in a first antenna direction, the CSI-RS is transmitted in a second antenna direction, the third bearer REs are REs originally occupied by the CSI-RS, and the third bearer REs are different from the first bearer REs.

Optionally, as shown in FIG. 12, the base station 300 further includes: a third receiving unit 343, configured to receive feedback information transmitted by the user equipment, where the feedback information is channel state information obtained by the user equipment through estimation according to the reference signal corresponding to each subband group in the multiple subband groups and the CSI-RS transmitted in the third bearer REs; and a third acquiring unit 353, configured to acquire the channel state of the user equipment according to the feedback information.

This embodiment may be applied to co-polarized and cross-polarized antenna arrays. For details, reference may be made to the related description in the method 100.

After the user equipment receives the reference signal corresponding to each subband group in the multiple subband groups and transmitted by the base station and the CSI-RS transmitted by using the third bearer REs, the user equipment may obtain, according to the reference signal corresponding to each subband group in the multiple subband groups, a CQI in the first direction and corresponding to each subband group in at least one subband group, and further, may obtain a CQI in the first direction and corresponding to each subband in each subband group in the at least one subband group; and obtain at least one of a precoding matrix indicator (PMI), a rank indicator (RI), and a CQI in the second direction, and feed back the obtained channel state information to the base station.

Therefore, after the third receiving unit 343 of the base station receives the channel state information fed back by the user equipment, the third acquiring unit 353 determines the channel state of the user equipment, so that the base station may perform transmission scheduling of the downlink traffic channel according to the channel state of the user equipment.

It should be understood that, the receiving unit 340 and the acquiring unit 350 shown in FIG. 11 may respectively include the first receiving unit 341 and the first acquiring unit 351, and/or respectively include the second receiving unit 342 and the second acquiring unit 352, and/or respectively include the third receiving unit 343 and the third acquiring unit 353.

It should also be understood that, the base station 300 according to the embodiment may correspond to the base station in the method of the embodiment, and may implement corresponding functions of the base station in the method, which is not further described herein for brevity.

Therefore, in the embodiments, on a basis of REs originally occupied by a CSI-RS, multiple subband groups are obtained by dividing physical resource blocks corresponding to the REs occupied by the CSI-RS; a reference signal corresponding to each subband group is obtained by performing a precoding operation on a CSI-RS originally carried in first bearer REs in each subband in each subband group, and different precoding is used when precoding operations are performed on the CSI-RS originally carried in the first bearer REs in different subband groups; and the reference signal corresponding to each subband group in the multiple subband groups is transmitted by using the first bearer REs in each subband group. Because different precoding is used when precoding operations are performed on the CSI-RS originally carried in the first bearer REs in different subband groups, reference signals corresponding to different subband groups may correspond to different antenna ports. Therefore, without increasing resource consumption, a quantity of antenna ports can be increased, and more transmit antennas can be supported. In addition, because new resources are not used, backward compatibility with legacy UE can be achieved.

Figure 13:
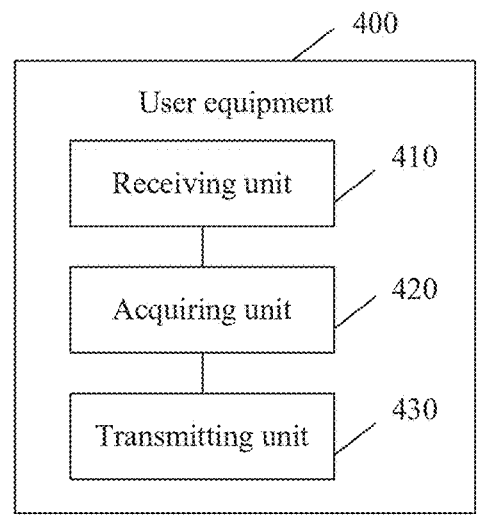
FIG. 13 is a schematic block diagram of user equipment according to an embodiment.

FIG. 13 is a schematic block diagram of user equipment 400 according to an embodiment. As shown in FIG. 13, the user equipment 400 includes: a receiving unit 410, configured to receive, in first bearer REs in each subband group in multiple subband groups, a reference signal transmitted by a base station and corresponding to each subband group, where the multiple subband groups are obtained by dividing multiple physical resource blocks corresponding to REs originally occupied by a CSI-RS, the reference signal corresponding to each subband group in the multiple subband groups is generated by performing a precoding operation on the CSI-RS originally carried in the first bearer REs in each subband in each subband group, and different precoding is used when precoding operations are performed on the CSI-RS originally carried in the first bearer REs in different subband groups; an acquiring unit 420, configured to obtain channel state information through estimation according to the reference signal corresponding to each subband group in the multiple subband groups; and a transmitting unit 430, configured to transmit feedback information to the base station, where the feedback information includes the channel state information.

Therefore, in this embodiment, on a basis of REs originally occupied by a CSI-RS, multiple subband groups are obtained by dividing physical resource blocks corresponding to the REs occupied by the CSI-RS; a reference signal corresponding to each subband group is obtained by performing a precoding operation on a CSI-RS originally carried in first bearer REs in each subband in each subband group, and different precoding is used when precoding operations are performed on the CSI-RS originally carried in the first bearer REs in different subband groups; the reference signal corresponding to each subband group in the multiple subband groups is transmitted by using the first bearer REs in each subband group; and user equipment obtains channel state information through channel estimation according to the signal corresponding to each subband group, and feeds back the channel state information to a base station. Because different precoding is used when precoding operations are performed on the CSI-RS originally carried in the first bearer REs in different subband groups, reference signals corresponding to different subband groups may correspond to different antenna ports. Therefore, without increasing resource consumption, a quantity of antenna ports can be increased, and more transmit antennas can be supported. In addition, because new resources are not used, backward compatibility with legacy user equipment UE can be achieved.

Optionally, in this embodiment, the CSI-RS is a CSI-RS defined in Rel-10 of an LTE protocol.

The following describes the user equipment 400 according to the embodiment with reference to several embodiments.

Embodiment A

In this embodiment, each subband group in the multiple subband groups includes multiple subbands, and each subband includes one physical resource block or multiple continuous physical resource blocks in a frequency domain, where the multiple subbands included in each subband group are discrete in the frequency domain. For a specific division manner, reference may be made to the description about FIG. 5 on a base station side. The following describes in detail a specific behavior of each unit of the user equipment in the resource division manner.

The acquiring unit 420 is specifically configured to obtain the channel state information through estimation according to the reference signal corresponding to each subband group in the multiple subband groups, where the channel state information includes channel state information corresponding to at least one subband group in the multiple subband groups and/or channel state information corresponding to each subband in the at least one subband group.

Specifically, the acquiring unit 420 performs channel estimation on each physical resource block in each subband group to obtain a signal to interference plus noise ratio (SINR) corresponding to each physical resource block in each subband group; performs averaging processing on SINRs corresponding to all physical resource blocks in each subband group to obtain an SINR corresponding to each subband group; determines, according to the SINR corresponding to each subband group, the at least one subband group from the multiple subband groups, where an SINR corresponding to each subband group in the at least one subband group is greater than an SINR corresponding to other subband groups than the at least one subband group; and obtains, according to the SINR corresponding to the at least one subband group, a CQI corresponding to the at least one subband group, where the channel state information includes the CQI corresponding to the at least one subband group.

Preferably, the acquiring unit 420 may determine one subband group from the multiple subband groups, where an SINR corresponding to the one subband group is greater than an SINR corresponding to any other subband group; and obtain, according to the SINR corresponding to the one subband group, a CQI corresponding to the one subband group. The transmitting unit 430 feeds back, to the base station, the CQI corresponding to the one subband group. Specifically, the transmitting unit 430 may feed back a subband group index value of the one subband group and a corresponding CQI value.

Optionally, the acquiring unit 420 may further obtain, according to an SINR value corresponding to a physical resource block of each subband in each subband group in the at least one subband group, an SINR value corresponding to each subband in each subband group in the at least one subband group; and obtain, according to the SINR value corresponding to each subband in each subband group in the at least one subband group, a CQI corresponding to each subband in each subband group in the at least one subband group. The transmitting unit 430 feeds back, to the base station, the CQI corresponding to each subband in each subband group in the at least one subband group. Specifically, the transmitting unit 430 may feed back an index value of each subband in the at least one subband group and a corresponding CQI value.

After receiving the CQI value corresponding to the at least one subband group and fed back by the user equipment, the base station may determine a spatial position in a corresponding direction of a uniform linear array in which the user equipment is located, and determine signal strength in the position. Therefore, the base station may perform transmission scheduling of a downlink traffic channel according to information of the spatial position of the user equipment (namely, the specific spatial position and strength).

If the transmitting unit 430 further feeds back, to the base station, the CQI of each subband in each subband group in the at least one subband group, the base station may perform scheduling for the user equipment with reference to both the CQI value corresponding to the at least one subband group and the CQI corresponding to each subband in the at least subband group. In this way, a channel state can be better used, and system performance can be improved. This is because the subbands included in each subband group are discrete in the frequency domain, but the CQI corresponding to the at least one subband group and determined by the user equipment is obtained from an average SINR of physical resource blocks included in the discrete subbands, and therefore can reflect a channel state of the entire system bandwidth; however, the user equipment feeds back, to the base station, the CQI corresponding to the subband included in each subband group in the at least one subband group, and the CQI can reflect a channel state corresponding to the subband because the CQI corresponding to the subband is obtained through channel estimation according to the reference signal carried in the subband.

Embodiment B

In this embodiment, each subband group in the multiple subband groups includes multiple subbands, and each subband includes one physical resource block or multiple continuous physical resource blocks in a frequency domain, where the multiple subbands included in each subband group are continuous in the frequency domain. For a specific division manner, reference may be made to the description about FIG. 6 on a base station side. The following describes in detail a specific behavior of each unit of the user equipment in the resource division manner.

The acquiring unit 420 is specifically configured to obtain the channel state information through estimation according to the reference signal corresponding to each subband group in the multiple subband groups, where the channel state information includes channel state information corresponding to at least one subband group in the multiple subband groups and/or channel state information corresponding to each subband in the at least one subband group.

Specifically, the acquiring unit performs channel estimation on each physical resource block in each subband group to obtain a SINR corresponding to each physical resource block in each subband group; performs averaging processing on SINRs corresponding to all physical resource blocks in each subband group to obtain an SINR corresponding to each subband group; determines, according to the SINR corresponding to each subband group, the at least one subband group from the multiple subband groups, where an SINR corresponding to each subband group in the at least one subband group is greater than an SINR corresponding to other subband groups than the at least one subband group; and obtains, according to the SINR corresponding to the at least one subband group, a CQI corresponding to the at least one subband group, where the channel state information includes the CQI corresponding to the at least one subband group.

Preferably, the acquiring unit 420 may determine one subband group from the multiple subband groups, where an SINR corresponding to the one subband group is greater than an SINR corresponding to any other subband group; and obtain, according to the SINR corresponding to the one subband group, a CQI corresponding to the one subband group. The transmitting unit 430 feeds back, to the base station, the CQI corresponding to the one subband group.

Specifically, the transmitting unit 430 may feed back a subband group index value of the one subband group and a corresponding CQI value.

Optionally, the acquiring unit 340 may further obtain, according to an SINR value corresponding to a physical resource block of each subband in each subband group in the at least one subband group, an SINR value corresponding to each subband in each subband group in the at least one subband group; and obtain, according to the SINR value corresponding to each subband in each subband group in the at least one subband group, a CQI corresponding to each subband in each subband group in the at least one subband group. The transmitting unit 430 feeds back, to the base station, the CQI corresponding to each subband in each subband group in the at least one subband group. Specifically, the transmitting unit 430 may feed back an index value of each subband in the at least one subband group and a corresponding CQI value.

After receiving the CQI value corresponding to the at least one subband group and fed back by the user equipment, the base station may determine a spatial position in a corresponding direction of a uniform linear array in which the user equipment is located, and determine signal strength in the position. Therefore, the base station may perform transmission scheduling of a downlink traffic channel according to information of the spatial position of the user equipment (namely, the specific spatial position and strength).

If the transmitting unit 430 further feeds back, to the base station, the CQI of each subband in each subband group in the at least one subband group, the base station may perform scheduling for the user equipment with reference to both the CQI value corresponding to the at least one subband group and the CQI corresponding to each subband in the at least subband group. In this way, a channel state can be better used, and system performance can be improved. This is because a frequency domain range of the subband group is large, and a CQI obtained from an average SINR of physical resource blocks included in the subband group may reflect channel states in a large frequency domain range; however, the user equipment feeds back, to the base station, the CQI corresponding to the subband included in each subband group in the at least one subband group, and the CQI can reflect channel states in a relatively small frequency domain range because a frequency domain range of the subband is relatively small and the CQI is obtained through channel estimation according to the reference signal carried in the subband.

Embodiment C

In this embodiment, the receiving unit 410 is further configured to receive the CSI-RS transmitted by the base station by using second bearer REs in each subband in each subband group, where the second bearer REs are REs originally occupied by the CSI-RS and are different from the first bearer REs, where the reference signal corresponding to each subband group in the multiple subband groups and the CSI-RS transmitted by using the second bearer REs are transmitted in a same antenna direction; and the acquiring unit 420 is specifically configured to obtain the channel state information through estimation according to the reference signal corresponding to each subband group in the multiple subband groups and the CSI-RS received in the second bearer REs.

Specifically, the acquiring unit 420 may perform subtraction between a channel estimation value obtained by performing channel estimation on the reference signal carried in the first bearer REs in each subband in each subband group in the multiple subband groups and a channel estimation value obtained by performing channel estimation on the reference signal carried in the second bearer REs in each subband group, to obtain a channel estimation value difference corresponding to each subband group, where the channel estimation values are SINRs and the channel estimation value difference is an SINR difference, or the channel estimation values are CQIs and the channel estimation value difference is a CQI difference; and determine at least one subband group according to the channel estimation value difference corresponding to each subband group, and determine the channel state information, where a channel estimation value difference of the at least one subband group is greater than channel estimation value differences of other subband groups, and the channel state information includes a CQI difference corresponding to each subband group in the at least one subband group.

Further, the channel state information includes a CQI difference corresponding to each subband in each subband group in the at least one subband group, where the CQI corresponding to each subband in each subband group in the at least one subband group is obtained by performing subtraction between a channel estimation value obtained by performing channel estimation according to the first bearer REs in each subband and a channel estimation value obtained by performing channel estimation according to the second bearer REs.

In this embodiment, the reference signal corresponding to each subband group in the multiple subband groups and the CSI-RS transmitted in the second bearer REs may be transmitted in different subframes or may be transmitted in a same subframe. When they are transmitted in a same subframe, it may be ensured that the reference signal corresponding to each subband group in the multiple subband groups has a same time domain channel response feature as much as possible, so that channel information in the frequency domain is estimated more accurately. However, transmission in different subframes brings flexibility to resource allocation and scheduling to some extent, and is also an effective solution when the UE is located in a relatively static channel environment. Specifically, whether to perform transmission in a same subframe or in different subframes may be determined according to a specific condition.

Embodiment D

In this embodiment, the receiving unit 410 is further configured to receive, in third bearer REs, the CSI-RS transmitted by the base station, where the reference signal corresponding to each subband group in the multiple subband groups is transmitted in a first antenna direction by the base station, the CSI-RS is transmitted in a second antenna direction by the base station by using the third bearer REs, and the third bearer REs are REs originally occupied by the CSI-RS and are different from the first bearer REs; and the acquiring unit 420 is specifically configured to obtain the channel state information through estimation according to the reference signal corresponding to each subband group in the multiple subband groups and the CSI-RS received in the third bearer REs.

Specifically, the acquiring unit 420 may obtain, according to the reference signal corresponding to each subband group in the multiple subband groups, a CQI in the first direction and corresponding to each subband group in at least one subband group; and obtain, according to the CSI-RS, at least one of a PMI, an RI, and a CQI in the second direction.

It should be understood that, the user equipment 400 according to the embodiment may correspond to the user equipment in the method of the embodiment, and may implement corresponding functions of the user equipment in the method, which is not further described herein for brevity.

Therefore, in the embodiments, on a basis of REs originally occupied by a CSI-RS, multiple subband groups are obtained by dividing physical resource blocks corresponding to the REs occupied by the CSI-RS; a reference signal corresponding to each subband group is obtained by performing a precoding operation on a CSI-RS originally carried in first bearer REs in each subband in each subband group, and different precoding is used when precoding operations are performed on the CSI-RS originally carried in the first bearer REs in different subband groups; the reference signal corresponding to each subband group in the multiple subband groups is transmitted by using the first bearer REs in each subband group; and user equipment obtains channel state information through channel estimation according to the signal corresponding to each subband group, and feeds back the channel state information to a base station. Because different precoding is used when precoding operations are performed on the CSI-RS originally carried in the first bearer REs in different subband groups, reference signals corresponding to different subband groups may correspond to different antenna ports. Therefore, without increasing resource consumption, a quantity of antenna ports can be increased, and more transmit antennas can be supported. In addition, because new resources are not used, backward compatibility with legacy user equipment UE can be achieved.

Figure 14:
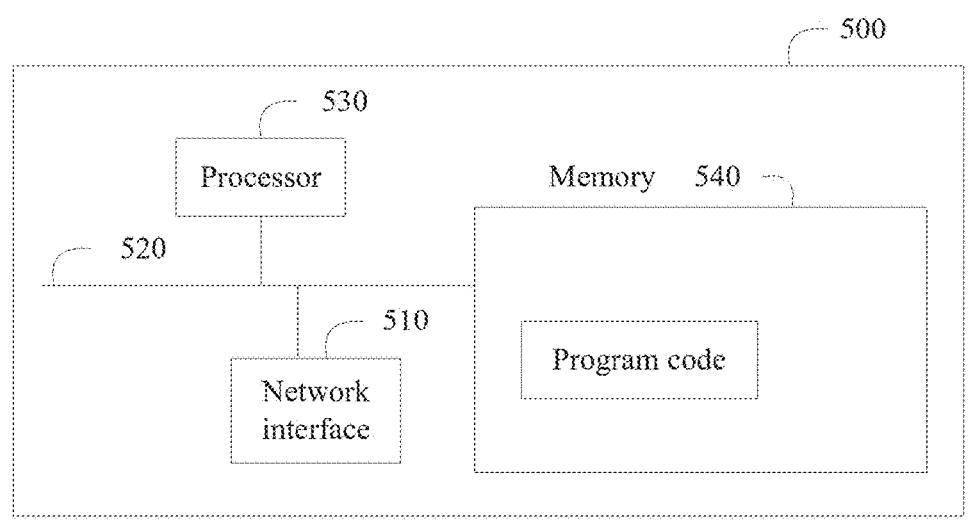
FIG. 14 is a schematic block diagram of a base station according to an embodiment.

FIG. 14 is a schematic block diagram of a base station 500 according to an embodiment. As shown in FIG. 14, the base station 500 includes a network interface 510, a bus 520, a processor 530, and a memory 540. The network interface 510 is configured to implement communication connection to at least one other network element; the bus 520 is configured to implement connection and communication between internal components of the base station; the memory 540 is configured to store program code; and the processor 530 is configured to invoke the program code stored in the memory 540 to perform the following operations: determining multiple subband groups, where the multiple subband groups are obtained by dividing multiple physical resource blocks corresponding to REs originally occupied by a CSI-RS, each subband group in the multiple subband groups includes at least one subband, and each subband includes at least one PRB, where the multiple physical resource blocks corresponding to the resource elements originally occupied by the CSI-RS may be all physical resource blocks corresponding to the resource elements occupied by the CSI-RS, or may be some physical resource blocks corresponding to the resource elements occupied by the CSI-RS; determining a reference signal corresponding to each subband group in the multiple subband groups, where the reference signal corresponding to each subband group is generated by performing a precoding operation on the CSI-RS originally carried in first bearer REs in each subband in each subband group, and different precoding is used when precoding operations are performed on the CSI-RS originally carried in the first bearer REs in different subband groups, so that the reference signal corresponding to each subband group in the multiple subband groups is a different reference signal; and transmitting, through the network interface 510 by using the first bearer REs in each subband group in the multiple subband groups, the reference signal corresponding to each subband group in the multiple subband groups.

Specifically, multiple subband groups may be obtained by dividing all or some physical resource blocks corresponding to REs occupied by CSI-RS corresponding to a certain antenna port, where each subband group may include at least one subband, and each subband may include at least one physical resource block; a reference signal corresponding to each subband group in the multiple subband groups is determined, where the reference signal corresponding to each subband group may be obtained by performing a precoding operation on a CSI-RS originally carried in first bearer REs in each subband in each subband group, and different precoding is used (that is, different precoding vectors or matrices are used) when precoding operations are performed on the CSI-RS originally carried in the first bearer REs in different subband groups; after the reference signal corresponding to each subband group in the multiple subband groups is determined, the reference signal corresponding to each subband group in the multiple subband groups may be transmitted by using the first bearer REs in each subband group in the multiple subband groups. The CSI-RS originally carried in the bearer REs refers to a CSI-RS carried in the REs in the prior art.

It should be understood that, in this embodiment, the reference signal corresponding to each subband group in the multiple subband groups may be preconfigured in the memory 540, where the preconfigured reference signal corresponding to each subband group in the multiple subband groups may also be generated based on the following principle: The reference signal corresponding to each subband group is obtained by performing a precoding operation on the CSI-RS originally carried in the first bearer REs in each subband in each subband group, and different precoding is used when precoding operations are performed on the CSI-RS originally carried in the first bearer REs in different subband groups.

It should also be understood that, in this embodiment, each subband included in the multiple subband groups may also be preconfigured in the memory 540, where the subbands included in the multiple subband groups are also preconfigured based on the following principle: The multiple subband groups are obtained by dividing multiple physical resource blocks corresponding to the REs originally occupied by the CSI-RS, each subband group in the multiple subband groups includes at least one subband, and each subband includes at least one physical resource block.

Therefore, in this embodiment, on a basis of REs originally occupied by a CSI-RS, multiple subband groups are obtained by dividing physical resource blocks corresponding to the REs occupied by the CSI-RS; a reference signal corresponding to each subband group is obtained by performing a precoding operation on a CSI-RS originally carried in first bearer REs in each subband in each subband group, and different precoding is used when precoding operations are performed on the CSI-RS originally carried in the first bearer REs in different subband groups; and the reference signal corresponding to each subband group in the multiple subband groups is transmitted by using the first bearer REs in each subband group. Because different precoding is used when precoding operations are performed on the CSI-RS originally carried in the first bearer REs in different subband groups, reference signals corresponding to different subband groups may correspond to different antenna ports. Therefore, without increasing resource consumption, a quantity of antenna ports can be increased, and more transmit antennas can be supported. In addition, because new resources are not used, backward compatibility with legacy UE can be achieved.

Optionally, the CSI-RS in this embodiment may be a CSI-RS defined in Release Rel-10 of an LTE protocol.

In this embodiment, a physical resource block corresponding to REs originally occupied by a CSI-RS means that, as long as a base station transmits the CSI-RS in some REs in a certain physical resource block in the prior art, it may be considered that the physical resource block is a physical resource block corresponding to the REs originally occupied by the CSI-RS.

Optionally, in this embodiment, that different precoding is used when precoding operations are performed on the CSI-RS originally carried in the first bearer REs in different subband groups may be that precoding pointing to different spatial directions is used, where the precoding may be a precoding vector or may be a precoding matrix or the like.

Optionally, the processor 530 is configured to invoke the program code stored in the memory 540 to further perform the following operations: receiving, through the network interface 510, feedback information transmitted by the user equipment, where the feedback information includes channel state information obtained by the user equipment through estimation according to the reference signal corresponding to each subband group in the multiple subband groups; and acquiring a channel state of the user equipment according to the feedback information.

Embodiment A

Each subband includes one physical resource block or multiple continuous physical resource blocks in a frequency domain, where the multiple subbands included in each subband group are continuous in the frequency domain. For a specific division method, reference may be made to the description about FIG. 5 in the method 100.

Optionally, the processor 530 is configured to invoke the program code stored in the memory 540 to further perform the following operations: receiving, through the network interface 510, feedback information transmitted by the user equipment, where the feedback information is channel state information obtained by the user equipment according to the reference signal corresponding to each subband group in the multiple subband groups, where the channel state information includes channel state information corresponding to at least one subband group and/or channel state information corresponding to each subband in the at least one subband group; and acquiring the channel state of the user equipment according to the feedback information.

Specifically, the user equipment may perform channel estimation on each physical resource block in each subband group to obtain an SINR corresponding to each frequency domain physical resource block in each subband group; perform averaging processing on SINRs corresponding to all physical resource blocks in each subband group to obtain an SINR corresponding to each subband group; determine, according to the SINR corresponding to each subband group, the at least one subband group from the multiple subband groups, where an SINR corresponding to each subband group in the at least one subband group is greater than an SINR corresponding to other subband groups than the at least one subband group; obtain, according to the SINR corresponding to the at least one subband group, a channel quality indicator (CQI) corresponding to the at least one subband group; and feed back, to the base station, the CQI corresponding to the at least one subband group.

Specifically, the user equipment may feed back a subband group index value of the at least one subband group and a corresponding CQI value.

Preferably, the user equipment may determine one subband group from the multiple subband groups, where an SINR corresponding to the one subband group is greater than an SINR corresponding to any other subband group; obtain, according to the SINR corresponding to the one subband group, a CQI corresponding to the one subband group; and feed back, to the base station, the CQI corresponding to the one subband group. Specifically, the user equipment may feed back a subband group index value of the one subband group and a corresponding CQI value.

Optionally, the user equipment may further obtain, according to an SINR value corresponding to a physical resource block of each subband in each subband group in the at least one subband group, an SINR value corresponding to each subband in each subband group in the at least one subband group; obtain, according to the SINR value corresponding to each subband in each subband group in the at least one subband group, a CQI corresponding to each subband in each subband group in the at least one subband group; and feed back, to the base station, the CQI corresponding to each subband in each subband group in the at least one subband group. Specifically, the user equipment may feed back an index value of each subband in the at least one subband group and a corresponding CQI value.

After receiving the CQI value corresponding to the at least one subband group and fed back by the user equipment, the base station may determine a spatial position in a corresponding direction of a uniform linear array in which the user equipment is located, and determine signal strength in the position. Therefore, the base station may perform transmission scheduling of a downlink traffic channel according to information of the spatial position of the user equipment (namely, the specific spatial position and strength).

If the user equipment further feeds back, to the base station, the CQI of each subband in each subband group in the at least one subband group, the base station may perform scheduling for the user equipment with reference to both the CQI value corresponding to the at least one subband group and the CQI corresponding to each subband in the at least subband group. In this way, the channel state can be better used, and system performance can be improved. This is because the subbands included in each subband group are discrete in the frequency domain, but the CQI corresponding to the at least one subband group and determined by the user equipment is obtained from an average SINR of physical resource blocks included in the discrete subbands, and therefore can reflect a channel state of the entire system bandwidth; however, the user equipment feeds back, to the base station, the CQI corresponding to the subband included in each subband group in the at least one subband group, and the CQI can reflect a channel state corresponding to the subband because the CQI corresponding to the subband is obtained through channel estimation according to the reference signal carried in the subband.

Embodiment B

Optionally, in this embodiment, each subband group in the multiple subband groups includes multiple subbands, and each subband includes one physical resource block or multiple continuous physical resource blocks in a frequency domain, where the multiple subbands included in each subband group are continuous in the frequency domain. For a specific division method, reference may be made to the description about FIG. 6 in the method 100.

Optionally, the processor 530 is configured to invoke the program code stored in the memory 540 to further perform the following operations: receiving, through the network interface, feedback information transmitted by the user equipment, where the feedback information is channel state information obtained by the user equipment according to the reference signal corresponding to each subband group in the multiple subband groups, where the channel state information includes channel state information corresponding to at least one subband group and/or channel state information corresponding to each subband in the at least one subband group; and acquiring the channel state of the user equipment according to the feedback information.

Specifically, the user equipment may perform channel estimation on each physical resource block in each subband group to obtain an SINR corresponding to each physical resource block in each subband group; perform averaging processing on SINRs corresponding to all physical resource blocks in each subband group to obtain an SINR corresponding to each subband group; determine, according to the SINR corresponding to each subband group, the at least one subband group from the multiple subband groups, where an SINR corresponding to each subband group in the at least one subband group is greater than an SINR corresponding to other subband groups than the at least one subband group; obtain, according to the SINR corresponding to the at least one subband group, a CQI corresponding to the at least one subband group; and feed back, to the base station, the CQI corresponding to the at least one subband group. Specifically, the user equipment may feed back a subband group index value of the at least one subband group and a corresponding CQI value.

Preferably, the user equipment may determine one subband group from the multiple subband groups, where an SINR corresponding to the one subband group is greater than an SINR corresponding to any other subband group; obtain, according to the SINR corresponding to the one subband group, a CQI corresponding to the one subband group; and feed back, to the base station, the CQI corresponding to the one subband group. Specifically, the user equipment may feed back a subband group index value of the one subband group and a corresponding CQI value.

Optionally, the user equipment may further obtain, according to an SINR value corresponding to a physical resource block of each subband in each subband group in the at least one subband group, an SINR value corresponding to each subband in each subband group in the at least one subband group; obtain, according to the SINR value corresponding to each subband in each subband group in the at least one subband group, a CQI corresponding to each subband in each subband group in the at least one subband group; and feed back, to the base station, the CQI corresponding to each subband in each subband group in the at least one subband group. Specifically, the user equipment may feed back an index value of each subband in the at least one subband group and a corresponding CQI value.

After receiving the CQI value corresponding to the at least one subband group and fed back by the user equipment, the base station may determine a spatial position in a corresponding direction of a uniform linear array in which the user equipment is located, and determine signal strength in the position. Therefore, the base station may perform transmission scheduling of a downlink traffic channel according to information of the spatial position of the user equipment (namely, the specific spatial position and strength).

If the user equipment further feeds back, to the base station, the CQI of each subband in each subband group in the at least one subband group, the base station may perform scheduling for the user equipment with reference to both the CQI value corresponding to the at least one subband group and the CQI corresponding to each subband in the at least subband group. In this way, the channel state can be better used, and system performance can be improved. This is because a frequency domain range of the subband group is large, and a CQI obtained from an average SINR of physical resource blocks included in the subband group may reflect channel states in a large frequency domain range; however, the user equipment feeds back, to the base station, the CQI corresponding to the subband included in each subband group in the at least one subband group, and the CQI can reflect channel states in a relatively small frequency domain range because a frequency domain range of the subband is relatively small and the CQI is obtained through channel estimation according to the reference signal carried in the subband.

Embodiment C

In this embodiment, the processor 530 is configured to invoke the program code stored in the memory 540 to further perform the following operation: transmitting the CSI-RS in second bearer REs in each subband in each subband group to the user equipment through the network interface 510, where the second bearer REs are REs originally occupied by the CSI-RS and are different from the first bearer REs; where the reference signal corresponding to each subband group in the multiple subband groups and the CSI-RS transmitted by using the second bearer REs are transmitted in a same antenna direction.

The base station may transmit the reference signal corresponding to each subband group in the multiple subband groups according to a manner of Embodiment A or according to a manner of Embodiment B, which is not further described herein for brevity.

The user equipment may perform subtraction between a channel estimation value obtained by performing channel estimation on the reference signal corresponding to the first bearer REs in each subband group in the multiple subband groups and a channel estimation value obtained by performing channel estimation on the reference signal in the second bearer REs in each subband group, to obtain a channel estimation value difference corresponding to each subband group, where the channel estimation values are SINRs and the channel estimation value difference is an SINR difference, or the channel estimation values are CQIs and the channel estimation value difference is a CQI difference.

Specifically, the user equipment may perform channel estimation on the first bearer REs in each subband in each subband group to obtain an SINR or a CQI, perform channel estimation on the second bearer REs in each subband in each subband group to obtain an SINR or a CQI, perform subtraction between the two obtained CQIs to obtain a CQI difference corresponding to each subband, or perform subtraction between the two obtained SINRs to obtain an SINR difference corresponding to each subband, and perform averaging processing on SINR differences or CQI differences corresponding to all subbands in each subband group to obtain a CQI difference or an SINR difference corresponding to each subband group.

Then the user equipment may determine at least one subband group according to the channel estimation value difference corresponding to each subband group, and determine the channel state information, where a channel estimation value difference of the at least one subband group is greater than channel estimation value differences of other subband groups, and the channel state information includes a CQI difference corresponding to each subband group in the at least one subband group. Therefore, the user equipment may feed back, to the base station, the CQI difference corresponding to each subband group in the at least one subband group, and specifically may feed back a subband group index and a corresponding CQI difference.

Optionally, similar to Embodiment A and Embodiment B, in this embodiment, the user equipment may further feed back, to the base station, a CQI difference corresponding to each subband in the at least one subband group.

After receiving, through the network interface 510, the CQI value corresponding to the at least one subband group and/or the CQI difference corresponding to each subband in the at least one subband group that are/is fed back by the user equipment, the base station may determine the channel state of the user equipment, and therefore may perform transmission scheduling of a downlink traffic channel according to the channel state of the user equipment.

In this embodiment, the reference signal corresponding to each subband group in the multiple subband groups and the CSI-RS transmitted in the second bearer REs may be transmitted in different subframes or may be transmitted in a same subframe. When they are transmitted in a same subframe, it may be ensured that the reference signal corresponding to each subband group in the multiple subband groups has a same time domain channel response feature as much as possible, so that channel information in the frequency domain is estimated more accurately. However, transmission in different subframes brings flexibility to resource allocation and scheduling to some extent, and is also an effective solution when the UE is located in a relatively static channel environment. Specifically, whether to perform transmission in a same subframe or in different subframes may be determined according to a specific condition.

Embodiment D

In this embodiment, the processor 530 is configured to invoke the program code stored in the memory 540 to further perform the following operation: transmitting the CSI-RS in third bearer REs through the network interface; where the reference signal corresponding to each subband group in the multiple subband groups is transmitted in a first antenna direction, the CSI-RS is transmitted in a second antenna direction, the third bearer REs are REs originally occupied by the CSI-RS, and the third bearer REs are different from the first bearer REs.

Optionally, the processor 530 is configured to invoke the program code stored in the memory 540 to perform the following operations: receiving, through the network interface 510, feedback information transmitted by the user equipment, where the feedback information is channel state information obtained by the user equipment through estimation according to the reference signal corresponding to each subband group in the multiple subband groups and the CSI-RS transmitted in the third bearer REs; and acquiring the channel state of the user equipment according to the feedback information.

Optionally, the channel state information includes a CQI in the first direction and corresponding to each subband group in at least one subband group, and/or includes at least one of a PMI, an RI, and a CQI in the second direction.

In this embodiment, the processor may also be referred to as a central processing unit (CPU). The memory may include a read-only memory and a random access memory, and provide an instruction and a signal to the processor. A part of the memory may further include a non-volatile random access memory (NVRAM). The bus further includes a power bus, a control bus, and a status signal bus in addition to a signal bus.

It should be understood that, the base station 500 according to the embodiment may correspond to the base station in the method of the embodiment, and may implement corresponding functions of the base station in the method, which is not further described herein for brevity.

Therefore, in the embodiments, on a basis of REs originally occupied by a CSI-RS, multiple subband groups are obtained by dividing physical resource blocks corresponding to the REs occupied by the CSI-RS; a reference signal corresponding to each subband group is obtained by performing a precoding operation on a CSI-RS originally carried in first bearer REs in each subband in each subband group, and different precoding is used when precoding operations are performed on the CSI-RS originally carried in the first bearer REs in different subband groups; and the reference signal corresponding to each subband group in the multiple subband groups is transmitted by using the first bearer REs in each subband group. Because different precoding is used when precoding operations are performed on the CSI-RS originally carried in the first bearer REs in different subband groups, reference signals corresponding to different subband groups may correspond to different antenna ports. Therefore, without increasing resource consumption, a quantity of antenna ports can be increased, and more transmit antennas can be supported. In addition, because new resources are not used, backward compatibility with legacy UE can be achieved.

Figure 15:
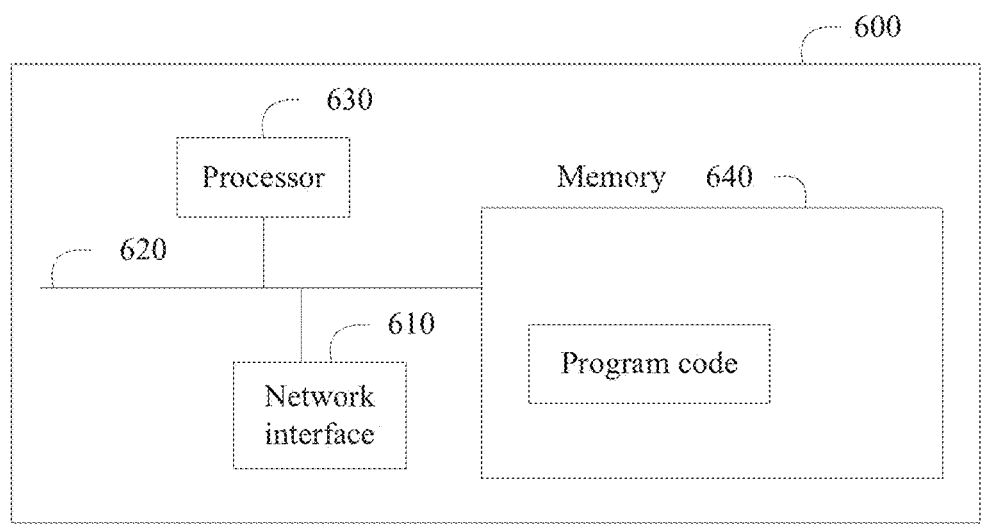
FIG. 15 is a schematic block diagram of user equipment according to an embodiment.

FIG. 15 is a schematic block diagram of user equipment 600 according to an embodiment. As shown in FIG. 15, the user equipment 600 includes a network interface 610, a bus 620, a processor 630, and a memory 640. The network interface 610 is configured to implement communication connection to at least one other network element; the bus is configured to implement connection and communication between internal components of the user equipment; the memory 640 is configured to store program code; and the processor 630 is configured to invoke the program code stored in the memory 640 to perform the following operations: receiving, in first bearer REs in each subband group in multiple subband groups through the network interface 610, a reference signal transmitted by a base station and corresponding to each subband group, where the multiple subband groups are obtained by dividing multiple physical resource blocks corresponding to REs originally occupied by a CSI-RS, the reference signal corresponding to each subband group in the multiple subband groups is generated by performing a precoding operation on the CSI-RS originally carried in the first bearer REs in each subband in each subband group, and different precoding is used when precoding operations are performed on the CSI-RS originally carried in the first bearer REs in different subband groups; obtaining channel state information through estimation according to the reference signal corresponding to each subband group in the multiple subband groups; and transmitting feedback information to the base station through the network interface 610, where the feedback information includes the channel state information.

Therefore, in this embodiment, on a basis of REs originally occupied by a CSI-RS, multiple subband groups are obtained by dividing physical resource blocks corresponding to the REs occupied by the CSI-RS; a reference signal corresponding to each subband group is obtained by performing a precoding operation on a CSI-RS originally carried in first bearer REs in each subband in each subband group, and different precoding is used when precoding operations are performed on the CSI-RS originally carried in the first bearer REs in different subband groups; the reference signal corresponding to each subband group in the multiple subband groups is transmitted by using the first bearer REs in each subband group; and user equipment obtains channel state information through channel estimation according to the signal corresponding to each subband group, and feeds back the channel state information to a base station. Because different precoding is used when precoding operations are performed on the CSI-RS originally carried in the first bearer REs in different subband groups, reference signals corresponding to different subband groups may correspond to different antenna ports. Therefore, without increasing resource consumption, a quantity of antenna ports can be increased, and more transmit antennas can be supported. In addition, because new resources are not used, backward compatibility with legacy user equipment UE can be achieved.

Optionally, in this embodiment, the CSI-RS is a CSI-RS defined in Rel-10 of an LTE protocol.

The following describes the user equipment 600 according to the embodiment with reference to several embodiments.

Embodiment A

In this embodiment, each subband group in the multiple subband groups includes multiple subbands, and each subband includes one physical resource block or multiple continuous physical resource blocks in a frequency domain, where the multiple subbands included in each subband group are discrete in the frequency domain. For a specific division manner, reference may be made to the description about FIG. 5 on a base station side.

In this embodiment, the processor 630 is configured to invoke the program code stored in the memory 640 to specifically perform the following operation: obtaining the channel state information through estimation according to the reference signal corresponding to each subband group in the multiple subband groups, where the channel state information includes channel state information corresponding to at least one subband group in the multiple subband groups and/or channel state information corresponding to each subband in the at least one subband group.

Specifically, the user equipment may perform channel estimation on each physical resource block in each subband group to obtain an SINR corresponding to each frequency domain physical resource block in each subband group; perform averaging processing on SINRs corresponding to all physical resource blocks in each subband group to obtain an SINR corresponding to each subband group; determine, according to the SINR corresponding to each subband group, the at least one subband group from the multiple subband groups, where an SINR corresponding to each subband group in the at least one subband group is greater than an SINR corresponding to other subband groups than the at least one subband group; obtain, according to the SINR corresponding to the at least one subband group, a channel quality indicator (CQI) corresponding to the at least one subband group; and feed back, to the base station, the CQI corresponding to the at least one subband group. Specifically, the user equipment may feed back a subband group index value of the at least one subband group and a corresponding CQI value.

Preferably, the user equipment may determine one subband group from the multiple subband groups, where an SINR corresponding to the one subband group is greater than an SINR corresponding to any other subband group; obtain, according to the SINR corresponding to the one subband group, a CQI corresponding to the one subband group; and feed back, to the base station, the CQI corresponding to the one subband group. Specifically, the user equipment may feed back a subband group index value of the one subband group and a corresponding CQI value.

Optionally, the user equipment may further obtain, according to an SINR value corresponding to a physical resource block of each subband in each subband group in the at least one subband group, an SINR value corresponding to each subband in each subband group in the at least one subband group; obtain, according to the SINR value corresponding to each subband in each subband group in the at least one subband group, a CQI corresponding to each subband in each subband group in the at least one subband group; and feed back, to the base station, the CQI corresponding to each subband in each subband group in the at least one subband group. Specifically, the user equipment may feed back an index value of each subband in the at least one subband group and a corresponding CQI value.

After receiving the CQI value corresponding to the at least one subband group and fed back by the user equipment, the base station may determine a spatial position in a corresponding direction of a uniform linear array in which the user equipment is located, and determine signal strength in the position. Therefore, the base station may perform transmission scheduling of a downlink traffic channel according to information of the spatial position of the user equipment (namely, the specific spatial position and strength).

If the user equipment further feeds back, to the base station, the CQI of each subband in each subband group in the at least one subband group, the base station may perform scheduling for the user equipment with reference to both the CQI value corresponding to the at least one subband group and the CQI corresponding to each subband in the at least subband group. In this way, a channel state can be better used, and system performance can be improved. This is because the subbands included in each subband group are discrete in the frequency domain, but the CQI corresponding to the at least one subband group and determined by the user equipment is obtained from an average SINR of physical resource blocks included in the discrete subbands, and therefore can reflect a channel state of the entire system bandwidth; however, the user equipment feeds back, to the base station, the CQI corresponding to the subband included in each subband group in the at least one subband group, and the CQI can reflect a channel state corresponding to the subband because the CQI corresponding to the subband is obtained through channel estimation according to the reference signal carried in the subband.

Embodiment B

In this embodiment, each subband group in the multiple subband groups includes multiple subbands, and each subband includes one physical resource block or multiple continuous physical resource blocks in a frequency domain, where the multiple subbands included in each subband group are continuous in the frequency domain. For a specific division manner, reference may be made to the description about FIG. 6 on a base station side.

In this embodiment, the processor 630 is configured to invoke the program code stored in the memory 640 to specifically perform the following operation: obtaining the channel state information through estimation according to the reference signal corresponding to each subband group in the multiple subband groups, where the channel state information includes channel state information corresponding to at least one subband group in the multiple subband groups and/or channel state information corresponding to each subband in the at least one subband group.

Specifically, the user equipment may perform channel estimation on each physical resource block in each subband group to obtain an SINR corresponding to each frequency domain physical resource block in each subband group; perform averaging processing on SINRs corresponding to all physical resource blocks in each subband group to obtain an SINR corresponding to each subband group; determine, according to the SINR corresponding to each subband group, the at least one subband group from the multiple subband groups, where an SINR corresponding to each subband group in the at least one subband group is greater than an SINR corresponding to other subband groups than the at least one subband group; obtain, according to the SINR corresponding to the at least one subband group, a channel quality indicator (CQI) corresponding to the at least one subband group; and feed back, to the base station, the CQI corresponding to the at least one subband group. Specifically, the user equipment may feed back a subband group index value of the at least one subband group and a corresponding CQI value.

Preferably, the user equipment may determine one subband group from the multiple subband groups, where an SINR corresponding to the one subband group is greater than an SINR corresponding to any other subband group; obtain, according to the SINR corresponding to the one subband group, a CQI corresponding to the one subband group; and feed back, to the base station, the CQI corresponding to the one subband group. Specifically, the user equipment may feed back a subband group index value of the one subband group and a corresponding CQI value.

Optionally, the user equipment may further obtain, according to an SINR value corresponding to a physical resource block of each subband in each subband group in the at least one subband group, an SINR value corresponding to each subband in each subband group in the at least one subband group; obtain, according to the SINR value corresponding to each subband in each subband group in the at least one subband group, a CQI corresponding to each subband in each subband group in the at least one subband group; and feed back, to the base station, the CQI corresponding to each subband in each subband group in the at least one subband group. Specifically, the user equipment may feed back an index value of each subband in the at least one subband group and a corresponding CQI value.

After receiving the CQI value corresponding to the at least one subband group and fed back by the user equipment, the base station may determine a spatial position in a corresponding direction of a uniform linear array in which the user equipment is located, and determine signal strength in the position. Therefore, the base station may perform transmission scheduling of a downlink traffic channel according to information of the spatial position of the user equipment (namely, the specific spatial position and strength).

If the user equipment further feeds back, to the base station, the CQI of each subband in each subband group in the at least one subband group, the base station may perform scheduling for the user equipment with reference to both the CQI value corresponding to the at least one subband group and the CQI corresponding to each subband in the at least subband group. In this way, a channel state can be better used, and system performance can be improved. This is because a frequency domain range of the subband group is large, and a CQI obtained from an average SINR of physical resource blocks included in the subband group may reflect channel states in a large frequency domain range; however, the user equipment feeds back, to the base station, the CQI corresponding to the subband included in each subband group in the at least one subband group, and the CQI can reflect channel states in a relatively small frequency domain range because a frequency domain range of the subband is relatively small and the CQI is obtained through channel estimation according to the reference signal carried in the subband.

Embodiment C

In this embodiment, the processor 630 is configured to invoke the program code stored in the memory 640 to perform the following operations: receiving, through the network interface 610, the CSI-RS transmitted by the base station by using second bearer REs in each subband in each subband group, where the second bearer REs are REs originally occupied by the CSI-RS and are different from the first bearer REs, where the reference signal corresponding to each subband group in the multiple subband groups and the CSI-RS transmitted by using the second bearer REs are transmitted in a same antenna direction; and obtaining the channel state information through estimation according to the reference signal corresponding to each subband group in the multiple subband groups and the CSI-RS received in the second bearer REs.

Specifically, the user equipment may perform subtraction between a channel estimation value obtained by performing channel estimation on the reference signal carried in the first bearer REs in each subband in each subband group in the multiple subband groups and a channel estimation value obtained by performing channel estimation on the reference signal carried in the second bearer REs in each subband group, to obtain a channel estimation value difference corresponding to each subband group, where the channel estimation values are SINRs and the channel estimation value difference is an SINR difference, or the channel estimation values are CQIs and the channel estimation value difference is a CQI difference; and determine at least one subband group according to the channel estimation value difference corresponding to each subband group, and determine the channel state information, where a channel estimation value difference of the at least one subband group is greater than channel estimation value differences of other subband groups, and the channel state information includes a CQI difference corresponding to each subband group in the at least one subband group.

Further, the channel state information includes a CQI difference corresponding to each subband in each subband group in the at least one subband group, where the CQI corresponding to each subband in each subband group in the at least one subband group is obtained by performing subtraction between a channel estimation value obtained by performing channel estimation according to the first bearer REs in each subband and a channel estimation value obtained by performing channel estimation according to the second bearer REs.

In this embodiment, the reference signal corresponding to each subband group in the multiple subband groups and the CSI-RS transmitted in the second bearer REs may be transmitted in different subframes or may be transmitted in a same subframe. When they are transmitted in a same subframe, it may be ensured that the reference signal corresponding to each subband group in the multiple subband groups has a same time domain channel response feature as much as possible, so that channel information in the frequency domain is estimated more accurately. However, transmission in different subframes brings flexibility to resource allocation and scheduling to some extent, and is also an effective solution when the UE is located in a relatively static channel environment. Specifically, whether to perform transmission in a same subframe or in different subframes may be determined according to a specific condition.

Embodiment D

In this embodiment, the processor 630 is configured to invoke the program code stored in the memory 640 to perform the following operations: receiving, in third bearer REs through the network interface 610, the CSI-RS transmitted by the base station, where the reference signal corresponding to each subband group in the multiple subband groups is transmitted in a first antenna direction by the base station, the CSI-RS is transmitted in a second antenna direction by the base station by using the third bearer REs, and the third bearer REs are REs originally occupied by the CSI-RS and are different from the first bearer REs; and obtaining the channel state information through estimation according to the reference signal corresponding to each subband group in the multiple subband groups and the CSI-RS received in the third bearer REs.

Specifically, a CQI in the first direction and corresponding to each subband group in at least one subband group may be obtained according to the reference signal corresponding to each subband group in the multiple subband groups; and at least one of a PMI, an RI, and a CQI in the second direction may be obtained according to the CSI-RS.

In this embodiment, the processor may also be referred to as a CPU. The memory may include a read-only memory and a random access memory, and provide an instruction and a signal to the processor. A part of the memory may further include a non-volatile random access memory (NVRAM). The bus further includes a power bus, a control bus, and a status signal bus in addition to a signal bus.

It should be understood that, the user equipment 600 according to the embodiment may correspond to the user equipment in the method of the embodiment, and may implement corresponding functions of the user equipment in the method, which is not further described herein for brevity.

Therefore, in the embodiments, on a basis of REs originally occupied by a CSI-RS, multiple subband groups are obtained by dividing physical resource blocks corresponding to the REs occupied by the CSI-RS; a reference signal corresponding to each subband group is obtained by performing a precoding operation on a CSI-RS originally carried in first bearer REs in each subband in each subband group, and different precoding is used when precoding operations are performed on the CSI-RS originally carried in the first bearer REs in different subband groups; the reference signal corresponding to each subband group in the multiple subband groups is transmitted by using the first bearer REs in each subband group; and user equipment obtains channel state information through channel estimation according to the signal corresponding to each subband group, and feeds back the channel state information to a base station. Because different precoding is used when precoding operations are performed on the CSI-RS originally carried in the first bearer REs in different subband groups, reference signals corresponding to different subband groups may correspond to different antenna ports. Therefore, without increasing resource consumption, a quantity of antenna ports can be increased, and more transmit antennas can be supported. In addition, because new resources are not used, backward compatibility with legacy user equipment UE can be achieved.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the embodiments essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments. The foregoing storage medium includes: any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners, but are not intended to limit the protection scope. Any variation or replacement readily figured out by a person skilled in the art within the technical scope disclosed in the embodiments shall fall within the protection scope of the embodiments. Therefore, the protection scope of the embodiments shall be subject to the protection scope of the claims.

What is claimed is:

1. A base station comprising:
   a processor; and
   a non-transitory computer readable storage medium storing a program for execution by the processor, the program including instructions to:
      determine multiple subband groups, wherein the multiple subband groups are obtained by dividing multiple physical resource blocks into the multiple subband groups, wherein after the dividing each subband group of the multiple subband groups comprises one or more resource element (REs) of the multiple physical resource blocks that are allocated to be occupied by one or more channel state information-reference signals (CSI-RSs), and wherein each subband group of the multiple subband groups comprises at least one subband;
      determine a plurality of reference signals, wherein the plurality of reference signals corresponds to each subband group of the multiple subband groups, and wherein determining the reference signal comprises:
         for each subband group of the multiple subband groups, performing a precoding operation on a respective CSI-RS of the one or more CSI-RSs that is allocated to be carried in respective one or more first bearer REs in each subband of the respective subband group, wherein different precoding operations are used is used in each different subband group; and
      transmit, using the one or more first bearer REs in each subband of each subband group of the multiple subband groups, the plurality of reference signals corresponding to the multiple subband groups.

2. The base station according to claim 1, wherein each subband group of the multiple subband groups comprises multiple subbands, and each subband of the multiple subbands comprises one physical resource block or multiple continuous physical resource blocks in a frequency domain, wherein the multiple subbands comprised in each subband group are continuous in the frequency domain.

3. The base station according to claim 1, wherein each subband group of the multiple subband groups comprises multiple subbands, and each subband of the multiple subbands comprises one physical resource block or multiple continuous physical resource blocks in a frequency domain, wherein the multiple subbands comprised in each subband group are discrete in the frequency domain.

4. The base station according to claim 1, wherein the instructions further comprise instructions to:

receive feedback information transmitted by a user equipment; and acquire a channel state of the user equipment according to the feedback information.

5. The base station according to claim 1, wherein the instructions further comprise instructions to:

for each subband group of the multiple subband groups, transmit the respective CSI-RS of the one or more CSI-RSs to a user equipment respective using one or more second bearer REs in each subband of the respective subband group, wherein the respective using one or more second bearer REs are allocated to be occupied by the respective CSI-RS, and wherein the respective one or more second bearer REs are different from the respective using one or more first bearer REs; and wherein for each subband group of the multiple subband groups, the respective reference signal corresponding to the respective subband group of the multiple subband groups and the respective CSI-RS of the one or more CSI-RSs are transmitted in a same antenna direction.

6. A user equipment comprising:

a processor; and a non-transitory computer readable storage medium storing a program for execution by the processor, the program including instructions to:

receive, in a plurality of first bearer resource elements (REs), a plurality of reference signals transmitted by a base station, wherein, for each subband group of multiple sub band groups, one or more first bearer REs of the plurality of first bearer REs correspond to the respective subband group, wherein a respective reference signal of the plurality of reference signals corresponds to each respective subband group, wherein the multiple subband groups are obtained by dividing multiple physical resource blocks into the multiple subband groups, wherein after the dividing each subband group of the multiple subband groups comprises one or more REs of the multiple physical resource blocks that are allocated to be occupied by one or more channel state information-reference signals (CSI-RSs), wherein, for each subband group of the multiple subband groups, the respective reference signal corresponding to the respective subband group is generated by performing a respective precoding operation on a respective CSI-RS of the one or more CSI-RSs that is allocated to be carried in the respective one or more first bearer REs in each subband of the respective subband group, and wherein different precoding operations are used in different subband groups;

obtain channel state information by estimating according to the plurality of reference signals corresponding to the multiple subband groups; and transmit feedback information to the base station, wherein the feedback information comprises the channel state information.

7. The user equipment according to claim 6, wherein each subband group of the multiple subband groups comprises multiple subbands, and each subband of the multiple subbands comprises one physical resource block or multiple continuous physical resource blocks in a frequency domain, and wherein the multiple subbands comprised in each subband group are continuous in the frequency domain.

8. The user equipment according to claim 6, wherein each subband group of the multiple subband groups comprises multiple subbands, and each subband of the multiple subbands comprises one physical resource block or multiple continuous physical resource blocks in a frequency domain, and wherein the multiple subbands comprised in each subband group are discrete in the frequency domain.

9. The user equipment according to claim 6, wherein the instructions further comprise instructions to:

obtain the channel state information by estimating according to the plurality of reference signals corresponding to the multiple subband groups, wherein the channel state information comprises channel state information corresponding to at least one subband group in the multiple subband groups or channel state information corresponding to each subband in the at least one subband group.

10. The user equipment according to claim 6, wherein the instructions further comprise instructions to:

receive the one or more CSI-RSs, wherein the one or more CSI-RSs are transmitted by the base station using a plurality of second bearer REs, wherein one or more second bearer REs of the plurality of REs are comprised in each subband in each subband group, wherein the plurality of second bearer REs allocated to be occupied by the one or more CSI-RSs, and the plurality of second bearer REs are different from the plurality of first bearer REs, and wherein for each subband group of the multiple subband groups, the respective reference signal corresponding to the respective subband and the respective CSI-RS are transmitted in a same antenna direction; and obtain the channel state information by estimating according to the plurality of reference signals corresponding to the multiple subband groups and the one or more CSI-RSs received in the plurality of second bearer REs.

11. A method comprising:

determining multiple subband groups, wherein the multiple subband groups are obtained by dividing multiple physical resource blocks into the multiple subband groups, wherein after the dividing each subband group of the multiple subband groups comprises one or more resource element (REs) of the multiple physical resource blocks that are allocated to be occupied by one or more channel state information-reference signals (CSI-RSs), and wherein each subband group of the multiple subband groups comprises at least one subband;

determining a plurality of reference signals, wherein the plurality of reference signals corresponds to each subband group of the multiple subband groups, and wherein determining the reference signal comprises:

for each subband group of the multiple subband groups, performing a precoding operation on a respective CSI-RS of the one or more CSI-RSs that is allocated to be carried in respective one or more first bearer REs in each subband of the respective subband group, and wherein different precoding operations are used in different subband groups; and transmitting, using the one or more first bearer REs in each subband of each subband group of the multiple subband groups, the plurality of reference signals corresponding to the multiple subband groups.

12. The method according to claim 11, wherein each subband group of the multiple subband groups comprises multiple subbands, wherein each subband of the multiple subbands comprises one physical resource block or multiple continuous physical resource blocks in a frequency domain, and wherein the multiple subbands in each subband group are continuous in the frequency domain.

13. The method according to claim 11, wherein each subband group of the multiple subband groups comprises multiple subbands, wherein each subband of the multiple subbands comprises one physical resource block or multiple continuous physical resource blocks in a frequency domain, and wherein the multiple subbands comprised in each subband group are discrete in the frequency domain.

14. The method according to claim 11, wherein the method further comprises:
receiving feedback information transmitted by a user equipment; and
acquiring a channel state of the user equipment according to the feedback information.

15. The method according to claim 11, wherein the method further comprises:
for each subband group of the multiple subband groups, transmitting the respective CSI-RS to a user equipment using respective one or more second bearer REs in each subband of the respective subband group, wherein the respective one or more second bearer REs are allocated to be occupied by the respective CSI-RS and are different from the respective one or more first bearer REs; and
wherein for each subband group of the multiple subband groups, the respective reference signal corresponding to the respective subband group and the respective CSI-RS of the one or more CSI-RSs are transmitted in a same antenna direction.

16. A method comprising:
receiving, in a plurality of first bearer resource elements (REs), a plurality of reference signals transmitted by a base station, wherein, for each subband group of multiple sub band groups, one or more first bearer REs of the plurality of first bearer REs correspond to the respective subband group, wherein a respective reference signal of the plurality of reference signals corresponds to each respective subband group, wherein the multiple subband groups are obtained by dividing multiple physical resource blocks into the multiple subband groups, wherein after the dividing each subband group of the multiple subband groups comprises one or more REs of the multiple physical resource blocks that are allocated to be occupied by one or more channel state information-reference signals (CSI-RSs), wherein, for each subband group of the multiple subband groups, the respective reference signal corresponding to the respective subband group is generated by performing a respective precoding operation on a respective CSI-RS of the one or more CSI-RSs that is allocated to be carried in the respective one or more first bearer REs in each subband of each subband group, and wherein different precoding operations are used in different subband groups;
obtaining channel state information by estimating according to the plurality of reference signals corresponding to the multiple subband groups; and
transmitting feedback information to the base station, wherein the feedback information comprises the channel state information.

17. The method according to claim 16, wherein each subband group of the multiple subband groups comprises multiple subbands, and each subband of the multiple subbands comprises one physical resource block or multiple continuous physical resource blocks in a frequency domain, wherein the multiple subbands in each subband group are continuous in the frequency domain.

18. The method according to claim 16, wherein each subband group of the multiple subband groups comprises multiple subbands, and each subband of the multiple subbands comprises one physical resource block or multiple continuous physical resource blocks in a frequency domain, wherein the multiple subbands comprised in each subband group are discrete in the frequency domain.

19. The method according to claim 16, wherein obtaining the channel state information through estimation according to the plurality of reference signals corresponding to the multiple subband groups comprises:
obtaining the channel state information through estimation according to the plurality of reference signals corresponding to the multiple subband groups, wherein the channel state information comprises channel state information corresponding to at least one subband group in the multiple subband groups or channel state information corresponding to each subband in the at least one subband group.

20. The method according to claim 16, wherein the method further comprises:
receiving the one or more CSI-RSs, wherein the one or more CSI-RSs are transmitted by the base station using a plurality of second bearer REs, wherein one or more second bearer REs of the plurality of REs are comprised in each subband in each subband group, wherein the plurality of second bearer REs are allocated to be occupied by the one or more CSI-RSs, and the plurality of second bearer REs are different from the plurality of first bearer REs, wherein for each subband group of the multiple subband groups, the respective reference signal corresponding to the respective subband group and the respective CSI-RS transmitted by using the second bearer REs are transmitted in a same antenna direction by the base station; and
wherein obtaining the channel state information through estimation according to the plurality of reference signals corresponding to the multiple subband groups comprises obtaining the channel state information through estimation according to the plurality of reference signals corresponding to the multiple subband groups and the one or more CSI-RSs received in the plurality of second bearer REs.

* * * * *

UNITED STATES PATENT AND TRADEMARK OFFICE
CERTIFICATE OF CORRECTION

PATENT NO. : 10,153,813 B2  
APPLICATION NO. : 15/352024  
DATED : December 11, 2018  
INVENTOR(S) : Chao Li Page 1 of 1

It is certified that error appears in the above-identified patent and that said Letters Patent is hereby corrected as shown below:

In the Claims

In Column 62, Line 46, Claim 1, delete "operations are used is used in each" and insert --operations are used in each--.

In Column 64, Lines 27-28, Claim 10, delete "corresponding to the respective subband and the respective CSI-RS" and insert --corresponding to the respective subband group and the respective CSI-RS--.

Signed and Sealed this  
Fifth Day of March, 2019

Andrei Iancu  
*Director of the United States Patent and Trademark Office*